United States Patent [19]

Findlay

[11] Patent Number: 5,579,672
[45] Date of Patent: Dec. 3, 1996

[54] WORK LENGTH STOPS

[76] Inventor: Brian D. Findlay, 87 Queen Victoria Street, Bexley 2207, New South Wales, Australia

[21] Appl. No.: 472,866

[22] Filed: Jun. 7, 1995

Related U.S. Application Data

[63] Continuation of Ser. No. 955,834, Oct. 2, 1992, abandoned, which is a continuation-in-part of Ser. No. 536,659, filed as PCT/AU88/00499, Dec. 23, 1988, Pat. No. 5,165,317.

[30]  Foreign Application Priority Data

Dec. 24, 1987 [AU] Australia ................................. PI 6087

[51] Int. Cl.⁶ .................................................. B26D 7/01
[52] U.S. Cl. ................... 83/468; 33/613; 33/755; 83/468.2; 83/522.11; 144/286.1; 269/315
[58] Field of Search ........................... 33/613, 633, 700, 33/755, 833; 83/468, 468.1, 468.2, 468.3, 468.7, 522.11, 522.16, 522.17, 574, 471.3; 269/385, 375; 144/285, 286.1, 253.1

[56]  References Cited

U.S. PATENT DOCUMENTS

| | | |
|---|---|---|
| 2,513,497 | 7/1950 | Laughlin . |
| 2,618,300 | 11/1952 | Freudenthaler ........................... 83/468 |
| 2,630,146 | 3/1953 | Van Tuyl . |
| 2,787,301 | 4/1957 | Anderson .............................. 83/468.2 |
| 2,818,892 | 1/1958 | Price . |
| 3,368,594 | 2/1968 | Drumbore . |
| 3,384,135 | 5/1968 | Frybenlund . |
| 3,810,311 | 5/1974 | Pingel ..................................... 269/315 |
| 4,030,718 | 6/1977 | Philipoff .................................. 264/315 |
| 4,111,088 | 9/1978 | Ziegelmeyer ............................ 83/468 |
| 4,557,170 | 12/1985 | Ingham .................................... 83/468 |
| 4,693,158 | 9/1987 | Price ....................................... 83/468 |
| 4,785,550 | 11/1988 | Wilkins ................................... 83/468 |
| 4,957,235 | 9/1990 | Benu et al. .............................. 83/468 |
| 5,040,443 | 8/1991 | Price ....................................... 83/468 |
| 5,197,365 | 3/1993 | Clifton .................................... 83/468 |

FOREIGN PATENT DOCUMENTS

49665/79  2/1987  Australia .

*Primary Examiner*—W. Donald Bray
*Attorney, Agent, or Firm*—Michael J. Striker

[57] ABSTRACT

A distance locating device or work length stop (120) for attachment to a machine tool apparatus (1) comprises an index (89) and a facility (85) for supporting a measuring tape (95)- The index (89) is situated to align with measurements on the tape (95) whereby the setting of a distance between the end (124) of a stopping member (120) and an edge of a saw blade attached to the apparatus can be read directly from the index (89).

29 Claims, 19 Drawing Sheets

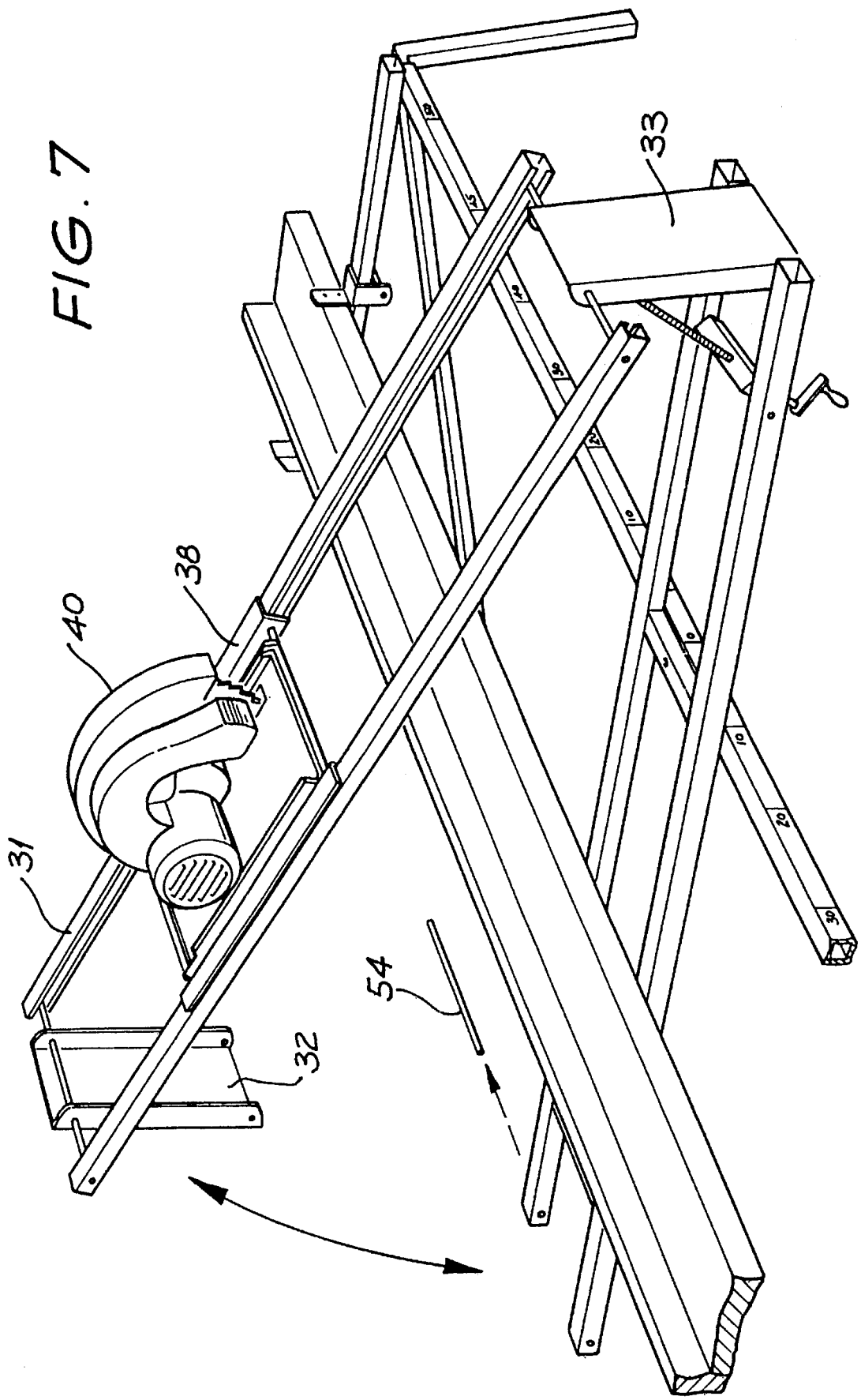

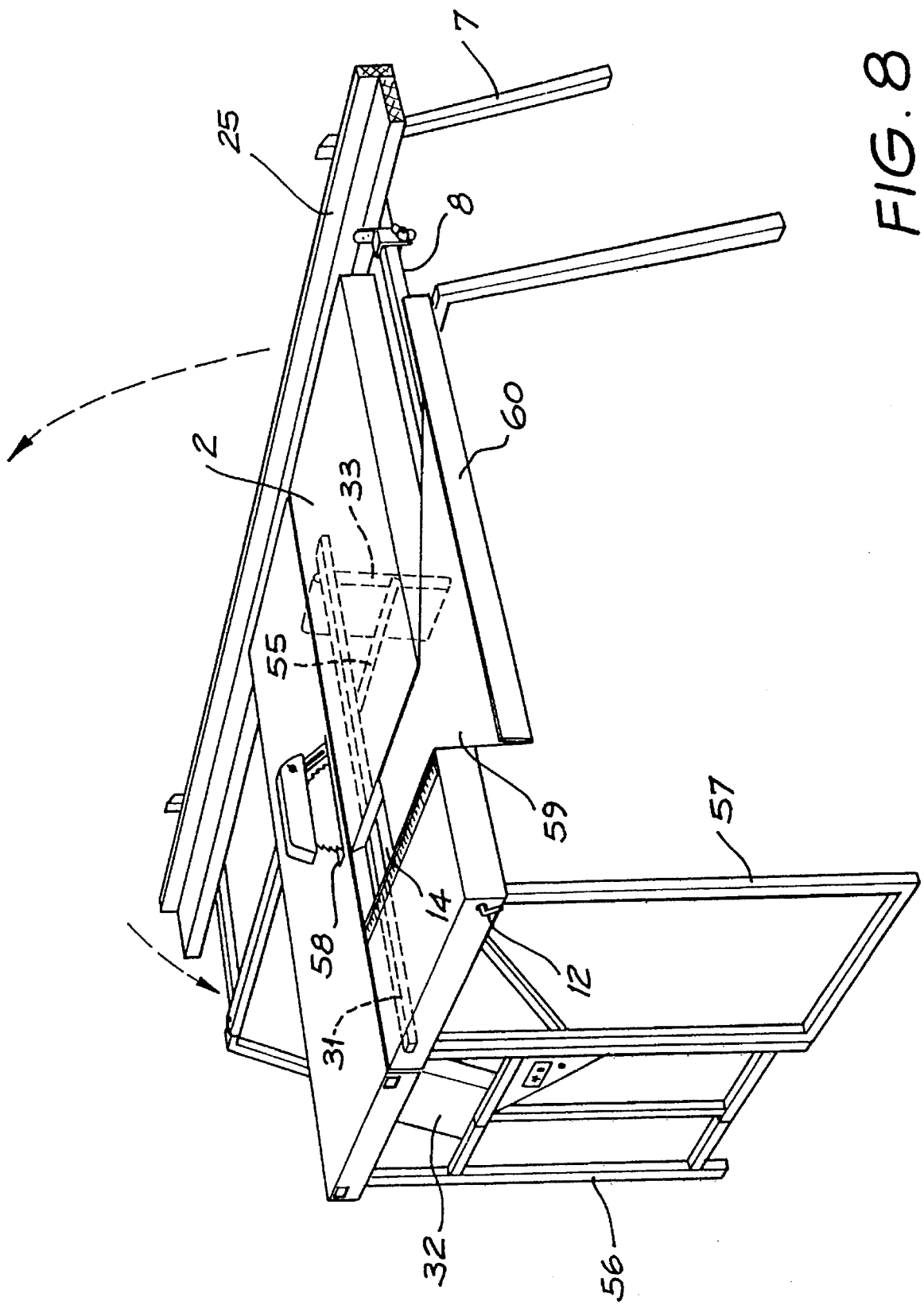

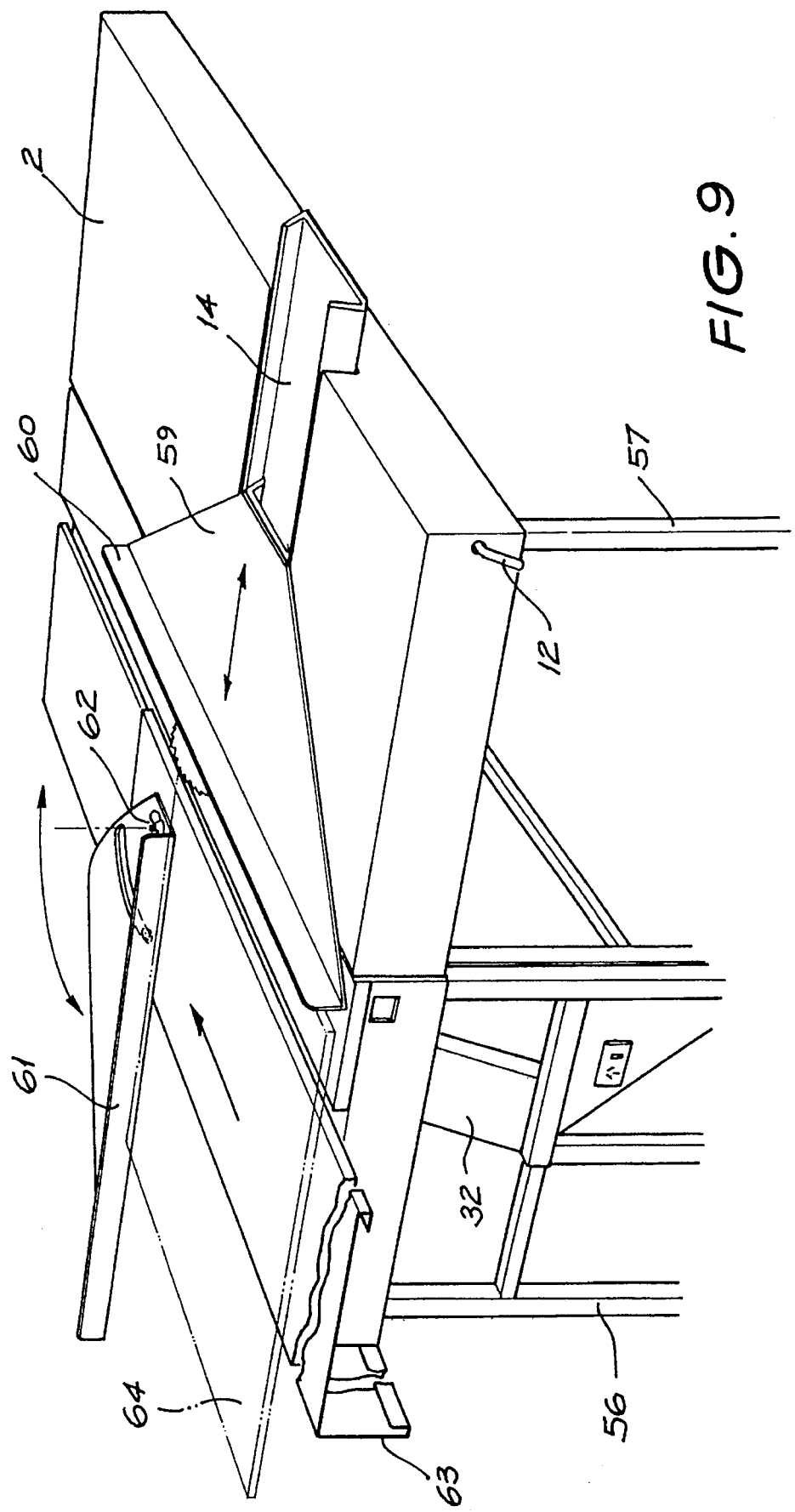

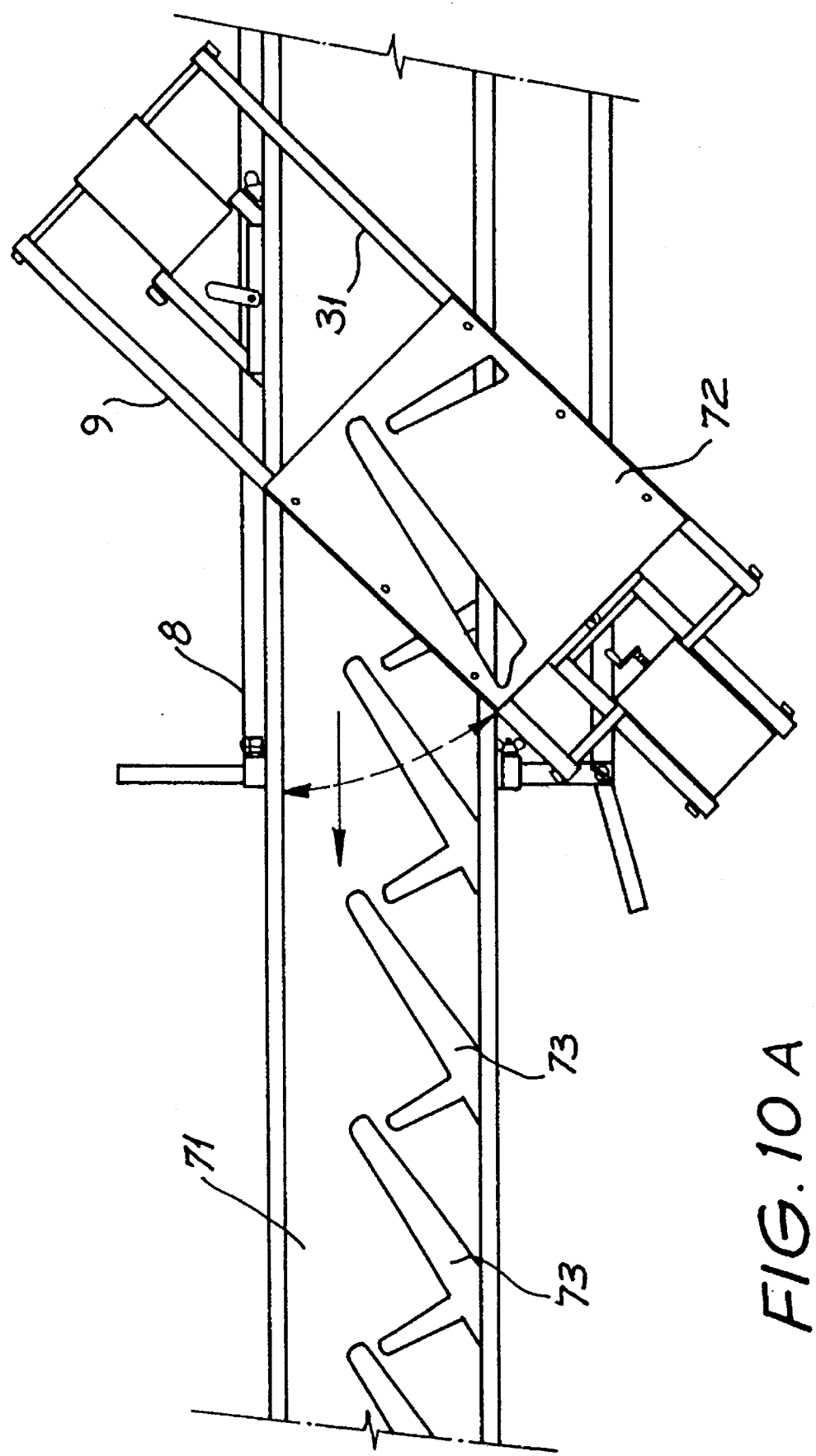

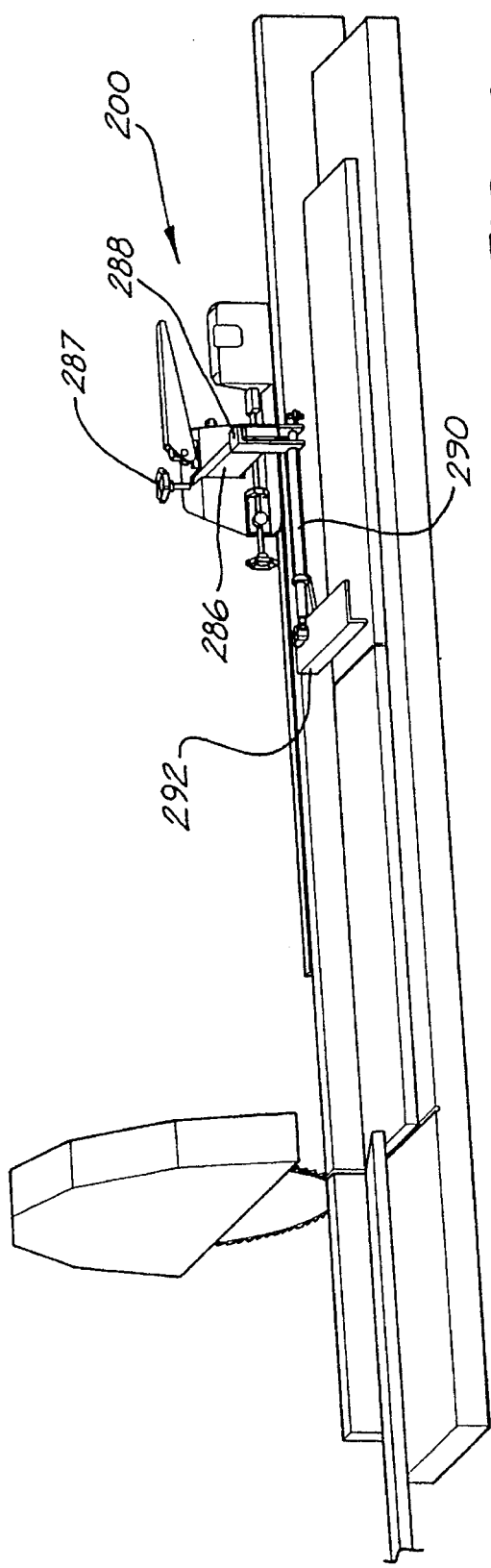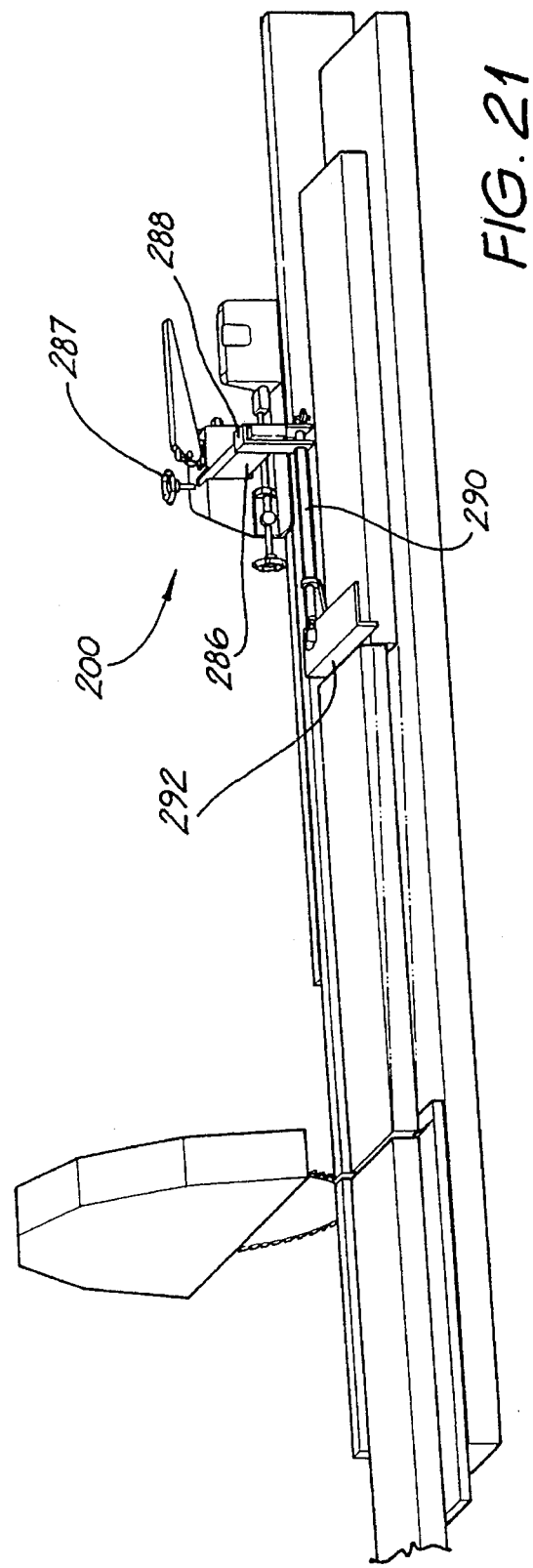

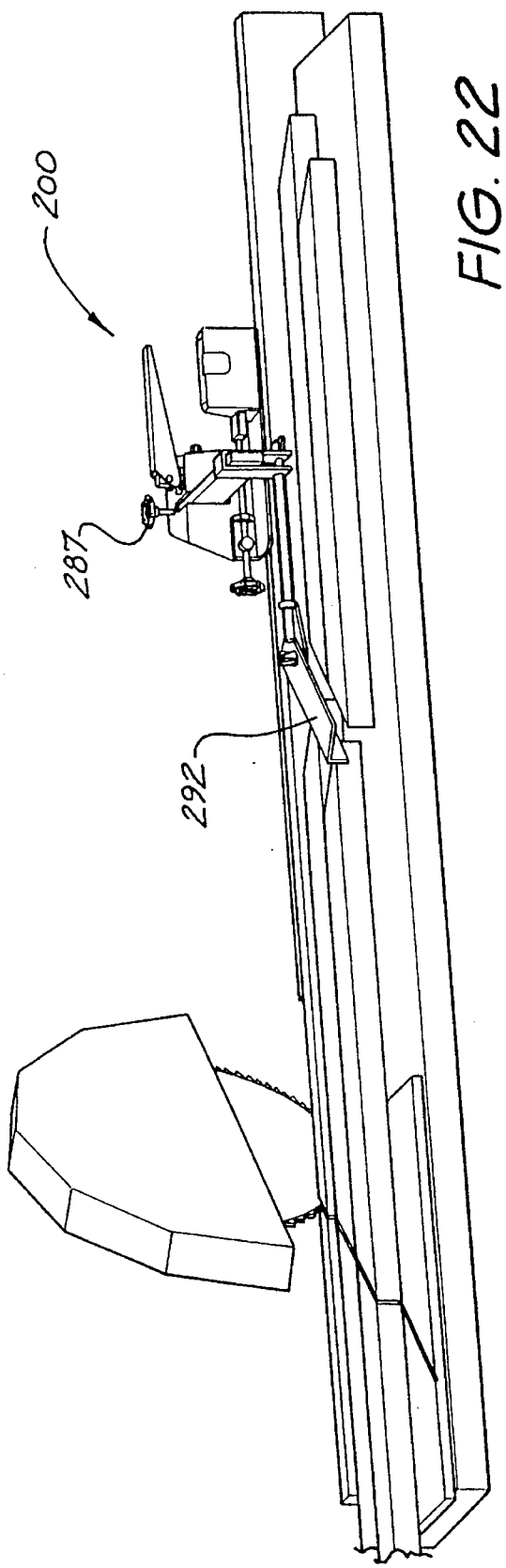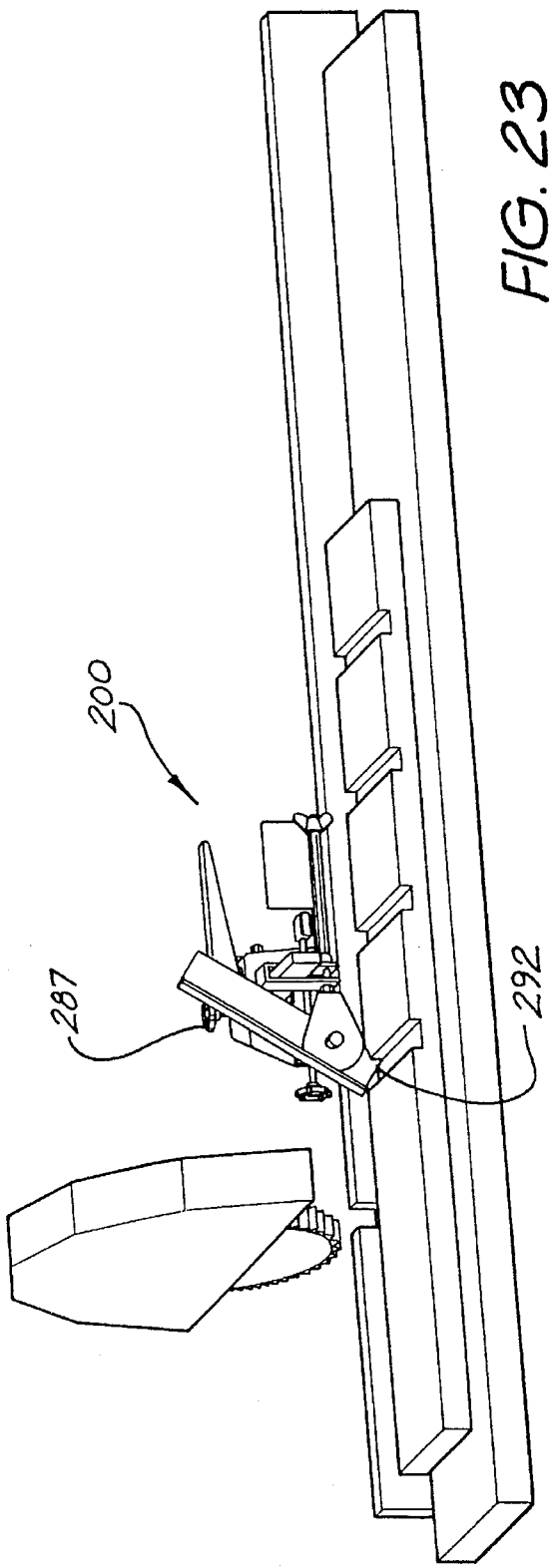

WORK LENGTH STOPS

This application is a C.I.P. of application Ser. No. 07/955,834, filed Oct. 2, 1992 and now abandoned, which was a C.I.P of application Ser. No. 07/536,659, filed as PCT/AU88/00499, Dec. 23, 1988 now U.S. Ser. No. 165,317.

The present invention relates to a workpiece positioning device, and more particularly to a work length top and barb device for positioning a workpiece easily and accurately, say, on a working surface of a portable, multi-purpose apparatus for controlling power tools as described in my International patent application PCT/AU88/00499.

BACKGROUND

When articles require operations using power/machine tools such as circular saws, routers, drill presses and the like, it is desirable to be able to position a workpiece rapidly, accurately, and repeatably in relation to an operative member of a power/machine tool or the like. Various methods are employed to do this with the amount of time required to setup for that being amortised over the number of parts requiring the particular operation e.g. cutting, drilling or whatever. The greater the speed, convenience and accuracy with which a setup can be established and used, the more efficiency is achieved. The more this efficiency can be applied to a lesser number of articles requiring such operations, as is the case when doing very small production runs and in situations requiring constant changes in setup, the improvement in efficiency becomes increasingly more significant.

A problem with setting up a worklength stop to an accurate length occurs in quickly locating the appropriate position with repeatable accuracy; this is often done simply by measuring between the stopping member and the operative member of the power/machine tool, normally requiring a test cut and then usually needing readjustment, with the whole process being repeated with each subsequent setting. A part solution to this is sometimes achieved by fixing a measuring tape to the workpiece support with time consuming regard to the accurate location of the tape and requiring great care that the tape's end does not interfere with the operative member. This works adequately for a cutting machine while the same angle of cut is used, but when changing from say a 90° square cut to, for example, 45° mitre, the previous setting is of no value and is in danger of enmeshing the tape with the operative member of the power/machine tool, and so another time consuming setup is required each time this is done.

Further, it is generally more desirable to use a worklength stop on a flat work piece support to provide constant support for sometimes flexible materials that require the operation; but when doing so, there is often a problem with a build up of debris at the stopping member; this can cause inaccuracies and also considerable inconvenience in having to watch for that effect and by the constant need to interrupt the work to clear the debris. A device that is substantially self clearing of such debris would provide considerably increased efficiency.

Furthermore, it would be advantageous if a worklength stop could be adapted for accurately spacing trenches, grooves and holes in relation to an operative member of a power/machine tool and therefore each other on a workpiece.

The present invention is concerned with a distance locating device of the form of device 80 shown in FIGS. 11–13 of PCT/AU88/00499, but in a preferred form has the added benefit of being adapted to act as a work length stop and barb without reorientation as required for the bar 90 as shown between FIGS. 13 and 14 of PCT/AU88/00499.

SUMMARY OF THE INVENTION

In one form the present invention consists in a distance locating device or work length stop adapted to be attached to a machine tool apparatus said device being adapted to support a measuring tape and including an index positioned to align with measurements on the tape, a stopping member of said device being positioned so that a distance between ends of the stopping member and an operative member of a machine tool attached to the apparatus corresponds to a measurement simultaneously read at the index.

In another form the present invention consists in a distance locating device or work length stop, adapted to be attached to a machine tool apparatus comprising a support adapted to be adjustably fixed to a workpiece guide of the machine tool apparatus, a rigid member secured to the support for movement within a plane and a stopping member adjustably securable along the rigid member and extending a transverse length from the rigid member in a direction towards the machine tool when attached to the apparatus, a barb projecting from and in the reverse direction of the stopping member, said barb being adapted in use to contact an end face of a trench formed in a workplace while maintaining the stopping member out of contact with said trench.

Preferably, the rigid member allows the device to rotate about a first axis substantially perpendicular to a longitudinal axis of the stopping member so that the positioning device may be used to position workpieces in at least two orientations with respect to the first axis.

Preferably, the rigid member further allows the device to be rotated about a second axis substantially parallel to the longitudinal axis of the stopping member, and the device further comprises e projection on said stopping member projecting away from the rigid member and wherein said projection is adapted to perform as a stop or as a barb when the device is rotated about the second axis.

Preferably, the projection extends to an effective centre of the rigid member such that when the device is rotated about the second axis, the projection may act at a fixed position as a stop for the workpiece in a first orientation or as a barb for the workpiece in a second orientation, and the device may also be rotated about the first axis such that the projection may act substantially at the fixed position as a barb for the workpiece in the first orientation or as a stop for the workpiece in the second orientation.

An auto trench locator/work length stop of the invention has the ability to maintain correct separations of trenches when operating. As well it can be connected to a measuring tape to provide East settings and have a micro adjustable zero when used as a work length stop.

BRIEF DESCRIPTION OF THE DRAWINGS

The invention will be described with reference to the accompanying drawings in which:

FIG. 7 is a schematic perspective view illustrating the first steps in the conversion of the apparatus of the parent invention from the work from above configuration to the work from below configuration;

FIG. 8 is a schematic perspective view of the apparatus of the parent invention in the work from below configurations;

FIG. 9 is a perspective view of the apparatus of the preferred embodiment of the parent invention as used in the work from below configuration;

FIG. 10A is a view similar to FIG. 10 in opposite "hand";

FIGS. 20–23 are perspective views showing the operation of a further embodiment of a distance locating device in accord with the present invention.

DETAILED DESCRIPTION

Figure 1:
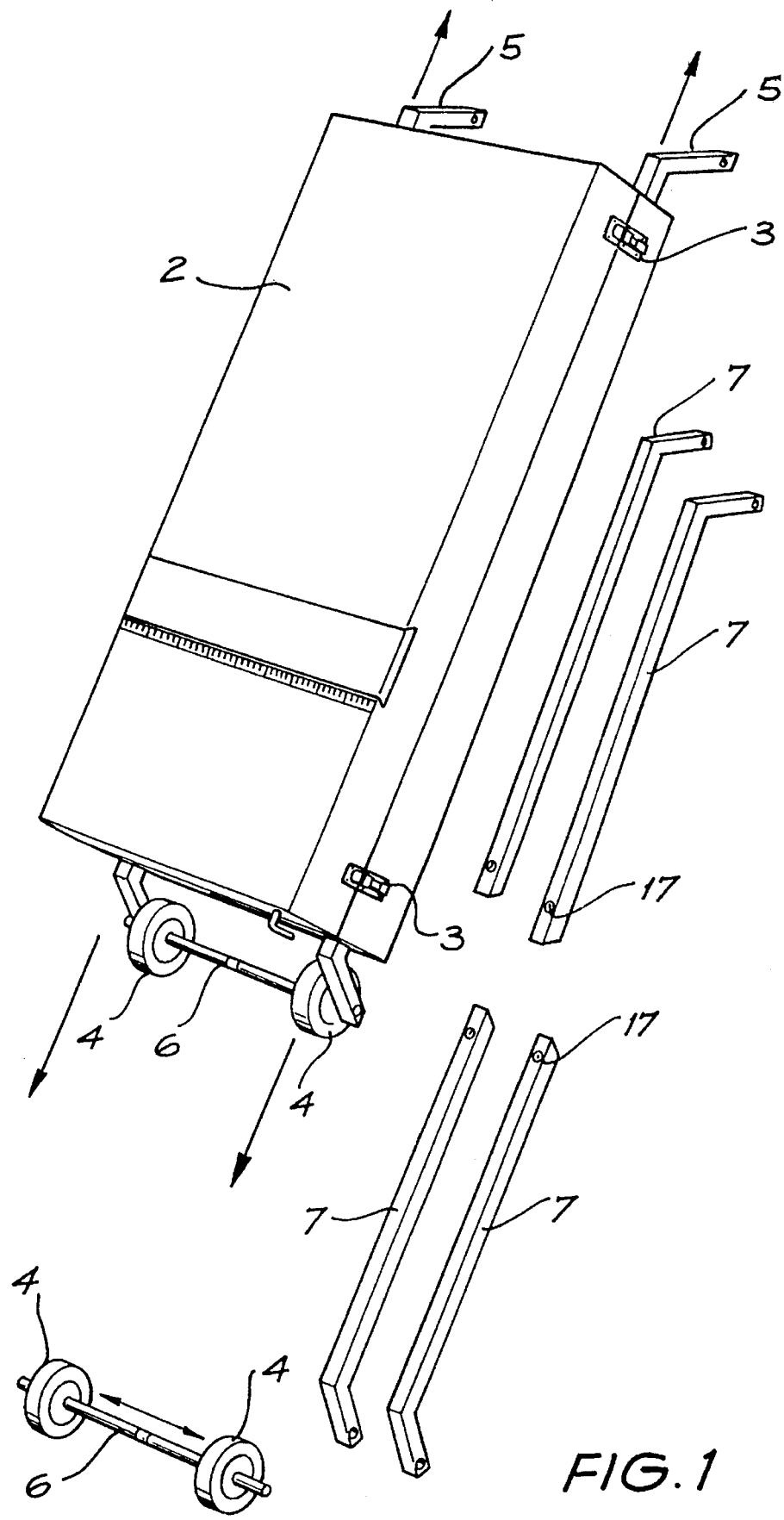
FIG. 1 is a perspective view of an embodiment of the apparatus of the parent invention in its dismantled condition and contained within a case.

As seen in FIG. 1, the apparatus 1 of the preferred embodiment of the parent invention is able, in its dismantled condition, to be located within a two part case 2 which is provided with a pair of locks 3. The case 2 is also provided with a pair of wheels 4 at one end and a pair of handles 5 at the other end. As schematically illustrated in FIG. 1, the axle 6 of the wheels 4 is longitudinally adjustable there by enabling the wheels 4 to be removed. As indicated by arrows in FIG. 1, the handles 5 and the supports for the wheels 4 are able to be removed from the case 2 and thereby constitute four legs 7.

Figure 2:
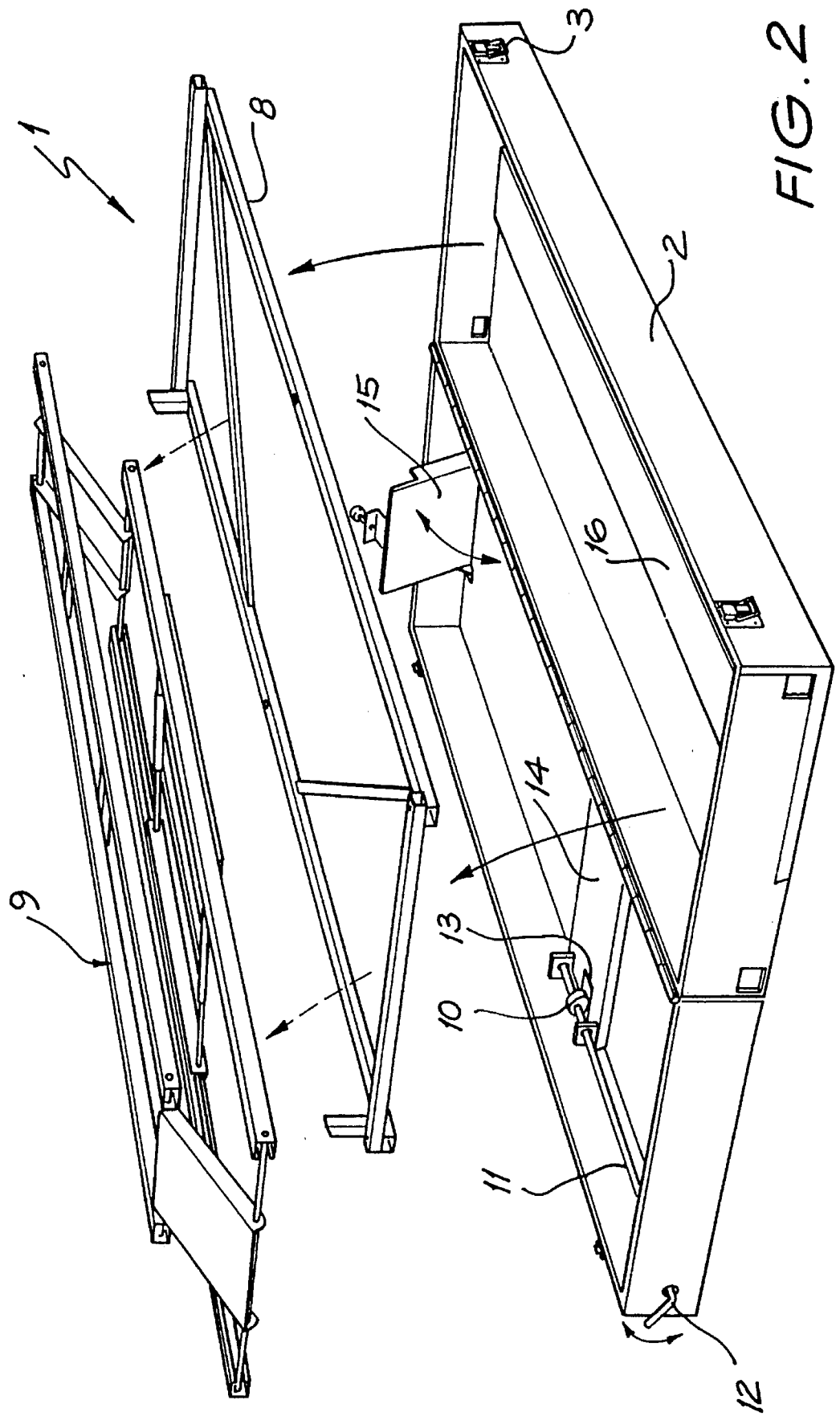
FIG. 2 is a Simplified exploded perspective view of the case of FIG. 1 in its opened condition illustrating how various components of the apparatus are removable from the case.

As seen in FIG. 2, the case 2 is able to be opened into a planar configuration and the two major sub-components of the apparatus 1 are able to be removed from the interior of the case 2. These sub-components are a base support frame 8 and a parallelogram linkage sub-frame 9. Also located within the interior of the case 2 is a locking cam 10 which is fixedly mounted on a. rotatable shaft 11 having a handle 12. The cam 10 is located over an opening 13 in a guide 14. Also located within the case 2 is a support plate 15. In the other half of the case 2 a longitudinally extending guide 16 is formed.

Figure 3:
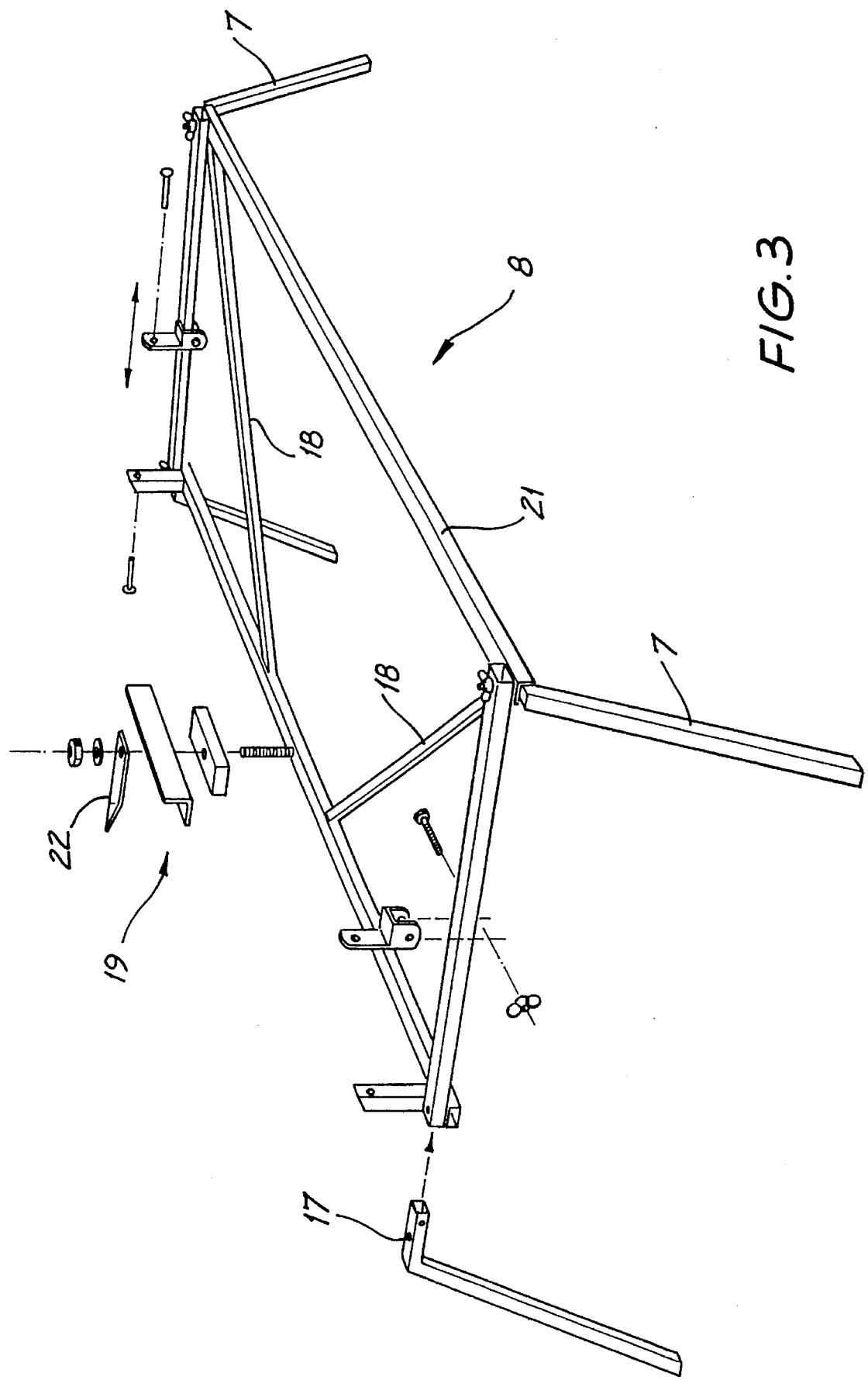
FIG. 3 is a perspective view of the base support frame of the preferred embodiment of the parent invention in a substantially fully assembled condition.

FIG. 3 illustrates the base support frame 8 in a substantially assembled condition in which the legs 7 are inserted into the hollow rectangular metal tubing of the frame 8 and releasably secured in place by any convenient conventional means such as spring pin catches 17 (FIG. 3) It will be appreciated that at each end of the frame 8, the legs 7 at the front extend somewhat outwardly and the legs 7 at the rear extend somewhat rearwardly thereby providing considerable stability. Further rigidity is given to the frame 8 by means of diagonal braces 18.

Centrally located at the rear of support frame 8 is a releasable clamp 19 which is illustrated in an exploded configuration.

Figure 3A:
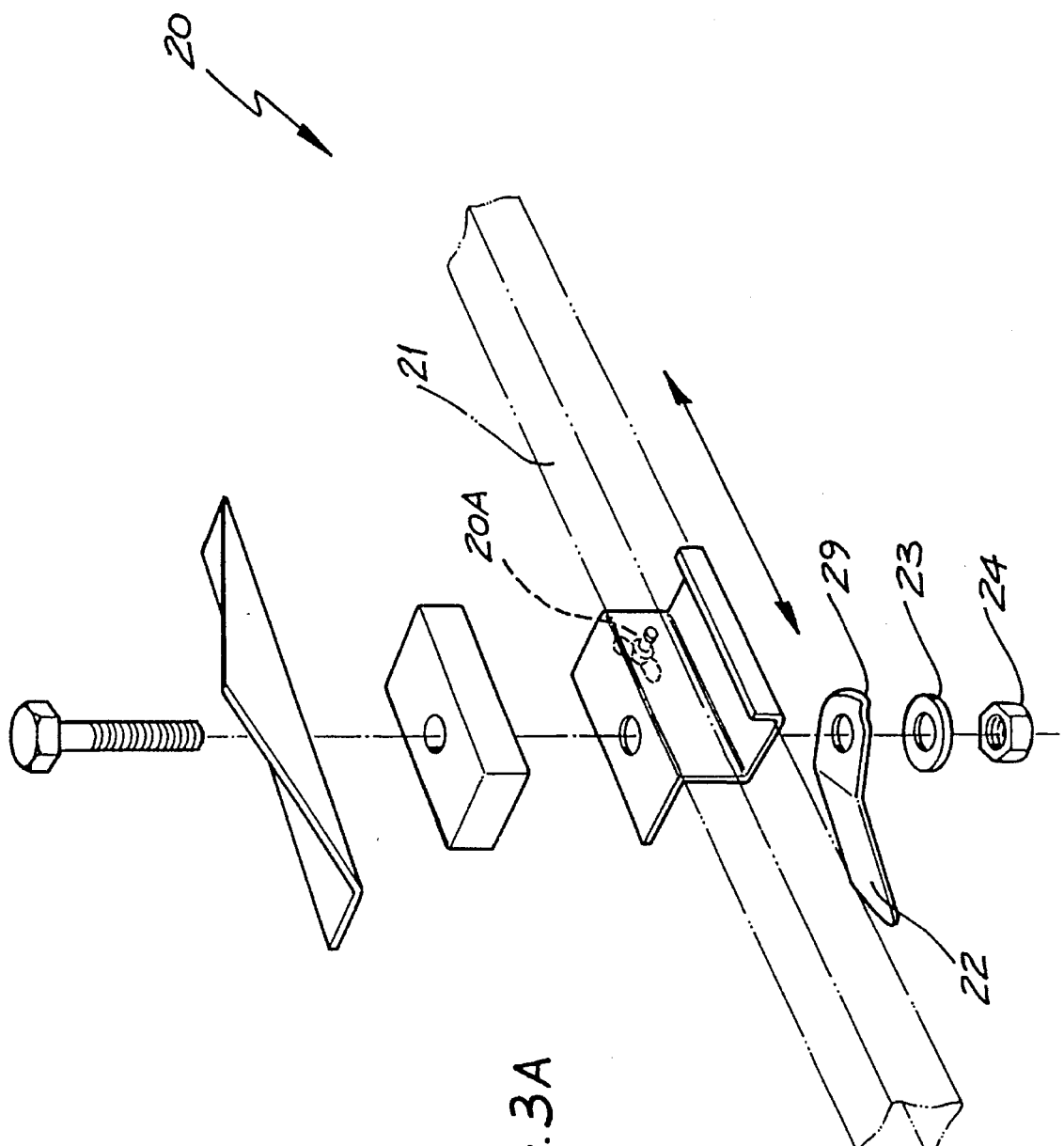
FIG. 3A is an exploded perspective view of a releasable clamp, used as a primary angle setting that allows longitudinal sliding of a tool carrier at a selectable set angle.

Also illustrated in exploded fashion in FIG. 3A is a further releasable clamp 20 which is able to be secured to the front cross-member 21 (FIG. 3) of the support frame 8. It will be appreciated that the releasable clamps 19 and 20 obtain their clamping action by means of hand operated turning levers 22 which have a portion 29 (FIG. 3A) adjacent the accompanying washer 23 which is distorted out of a flat condition. As a consequence turning the lever 22 can increase or decrease the effective thickness of the material under the corresponding nut 24 and thereby apply or release the clamp. But these could be locked by other methods such as proprietary line adjustable clamp levers.

Figure 4:
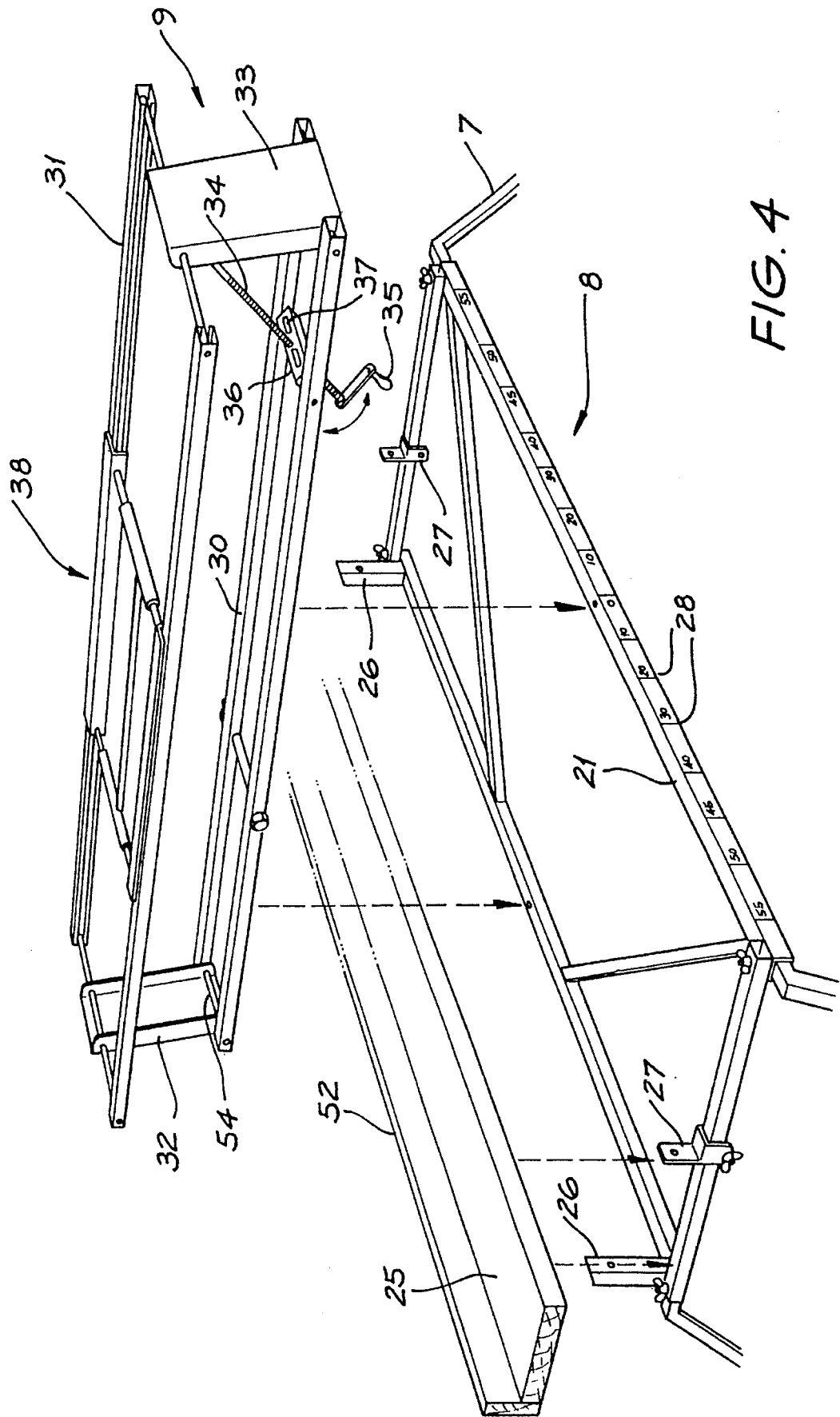
FIG. 4 is a perspective view of a mechanically variable parallelogram linkage frame of the apparatus of the parent invention which is able to be adjustably positioned on the support frame of FIG. 3.

As seen in FIG. 4, the parallelogram frame 9 is located on the support frame 8 and the clamps 19 and 20 hold the frame 9 in position as will be described hereafter. Furthermore, a support guide 25 of substantially L-shaped cross-section is positioned on the support frame 8 between back rests 26 and front stops 27. As schematically illustrated in FIG. 4, the front cross-member 21 is preferably provided with markings 28 so as to indicate the angle of the parallelogram frame 9 relative to the support frame 8.

An alternative to the markings 28 is a conventional protractor (not shown) and a co-operative index marker (not shown) each fixed to one of the frame 8 and frame 9 so that rotation of the frame 9 relative to the frame 8 is shown by the index against the protractor.

Also illustrated in FIG. 4 is the parallelogram frame 9 which is formed from a pair of lower rails 30 and upper rails 31 which are pivoted at each end by linkages 32 and 33 which enable the spacing between the lower rails 30 and upper rails 31 to be variably controlled while still maintaining the rails 30, 31 parallel to each other. This control is by a threaded rod 34 rotatable by handle 35 and threadably engaged in a block 36 carried between the lower rails 30. The variably controlled height of the upper rails 31 is mechanically located at any desired position by the threaded engagement between the rod 34 and the block 36. The block 36 is located and secured by spring loaded detents 37 to enable the block 36 to be removed from between the lower rails 30 when it is intended to fully collapse the parallelogram frame 9.

In an alternative not illustrated the threaded rod 34 is releasably engaged with the block 36 so as to allow its quick release when folding down the parallelogram frame 9. Slidably mounted on the upper rails 31 is a carriage 38 to be described in more detail hereafter.

Figure 5:
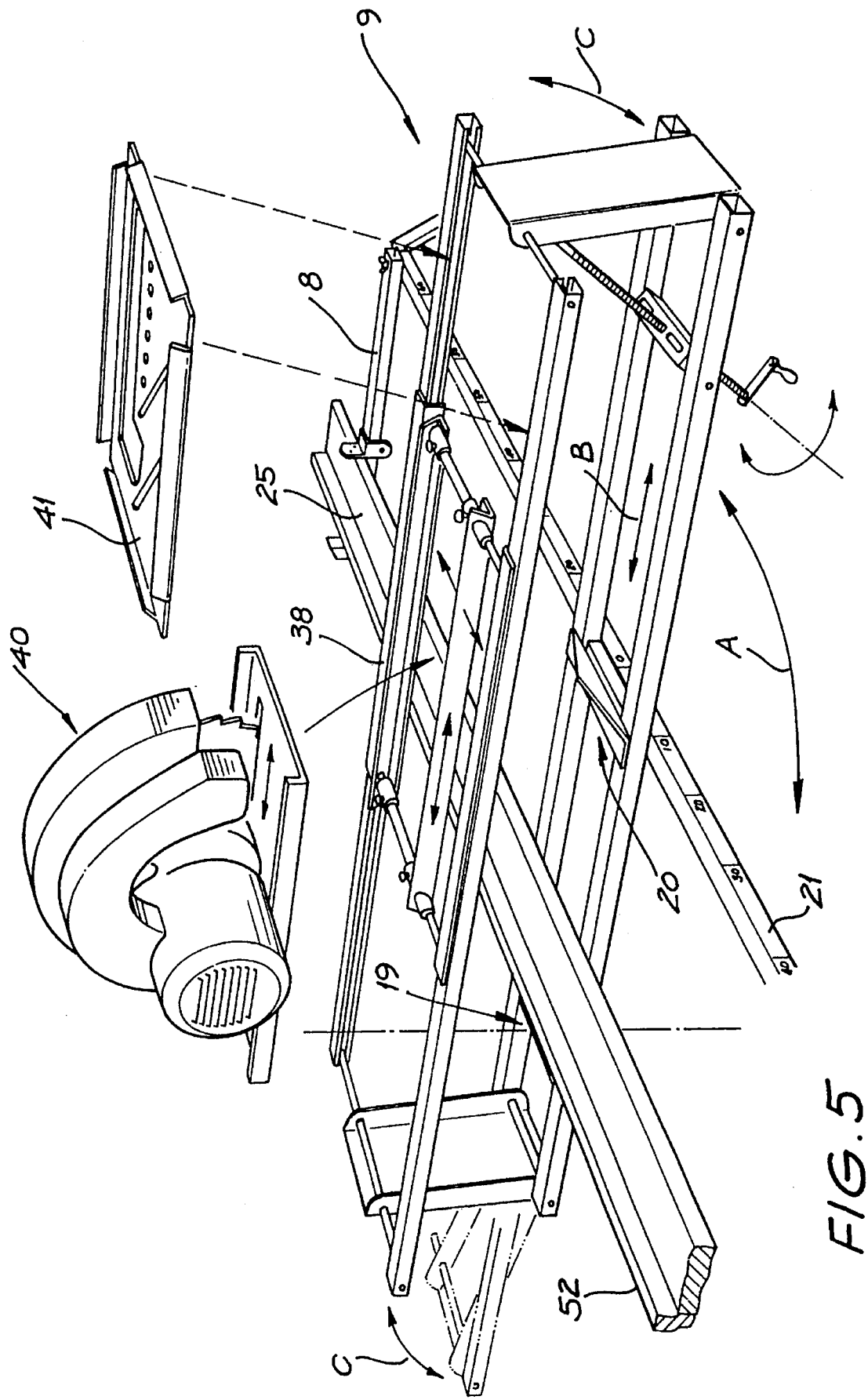
FIG. 5 is a further perspective view illustrating some detail of a power tool mounting carried by the parallelogram linkage of FIG. 4 and illustrating two alternate mounting arrangements.

The general arrangement of the parallelogram frame 9, support frame 8 and support guide 25 are illustrated in FIG. 5. In this connection it will be appreciated that the frame 9 pivots about the rear releasable clamp 19 in the direction indicated by arrow A in FIG. 5. The operation of clamp 20 sets the angle between the lower rails 30 and front cross-member 21 thereby determining the angle between the support frame 8 and parallelogram frame 9.

A thumbscrew 20A is located on the clamp 20 for locking only the angle setting thus allowing the frame 9 to freely slide longitudinally while secured at the set angle for an extended range to the length of cut, and clamps 19 and 20 are able to lock the frame 9 at any required longitudinal position.

It will be appreciated that the thumbscrew 20A is primarily for securing only the angle while the clamps 19 and 20 fix not only the angle of the parallelogram frame 9 relative to the base frame 8 but Longitudinal location as well. The clamps 19, 20 are so arranged as to permit longitudinal sliding motion of the lower rails 30 relative to the front cross-member 21 in the direction of arrow B. In this way, the entire parallelogram frame 9 can be longitudinally and angularly reciprocated relative to the base support frame 8. Rotation of handle 35 raises or lowers the upper rails 31 and carriage 3 as indicated by broken lines and arrows C in FIG. 5.

Figure 6:
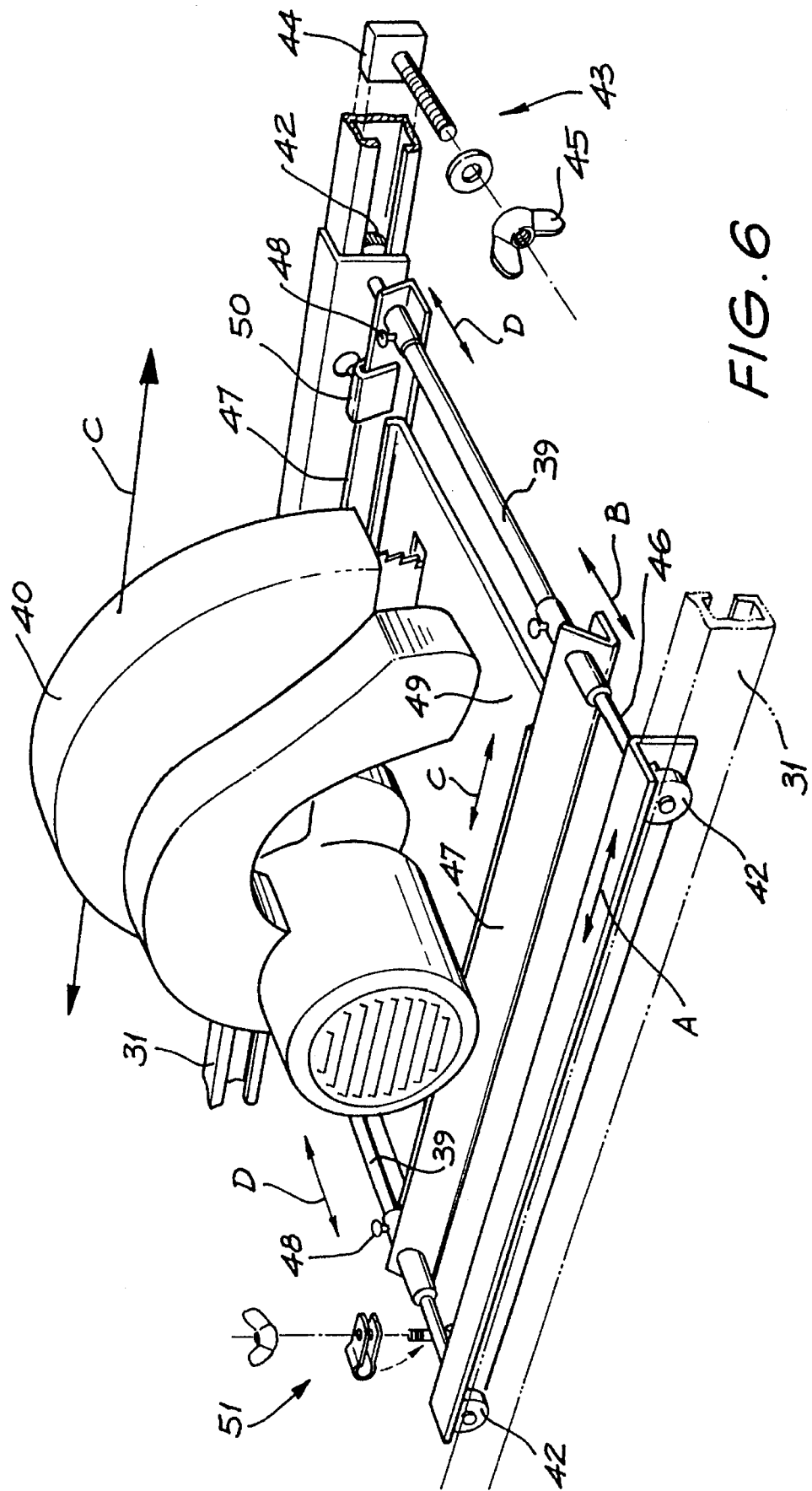
FIG. 6 is a perspective view of a first mounting arrangement.
Figure 6A:
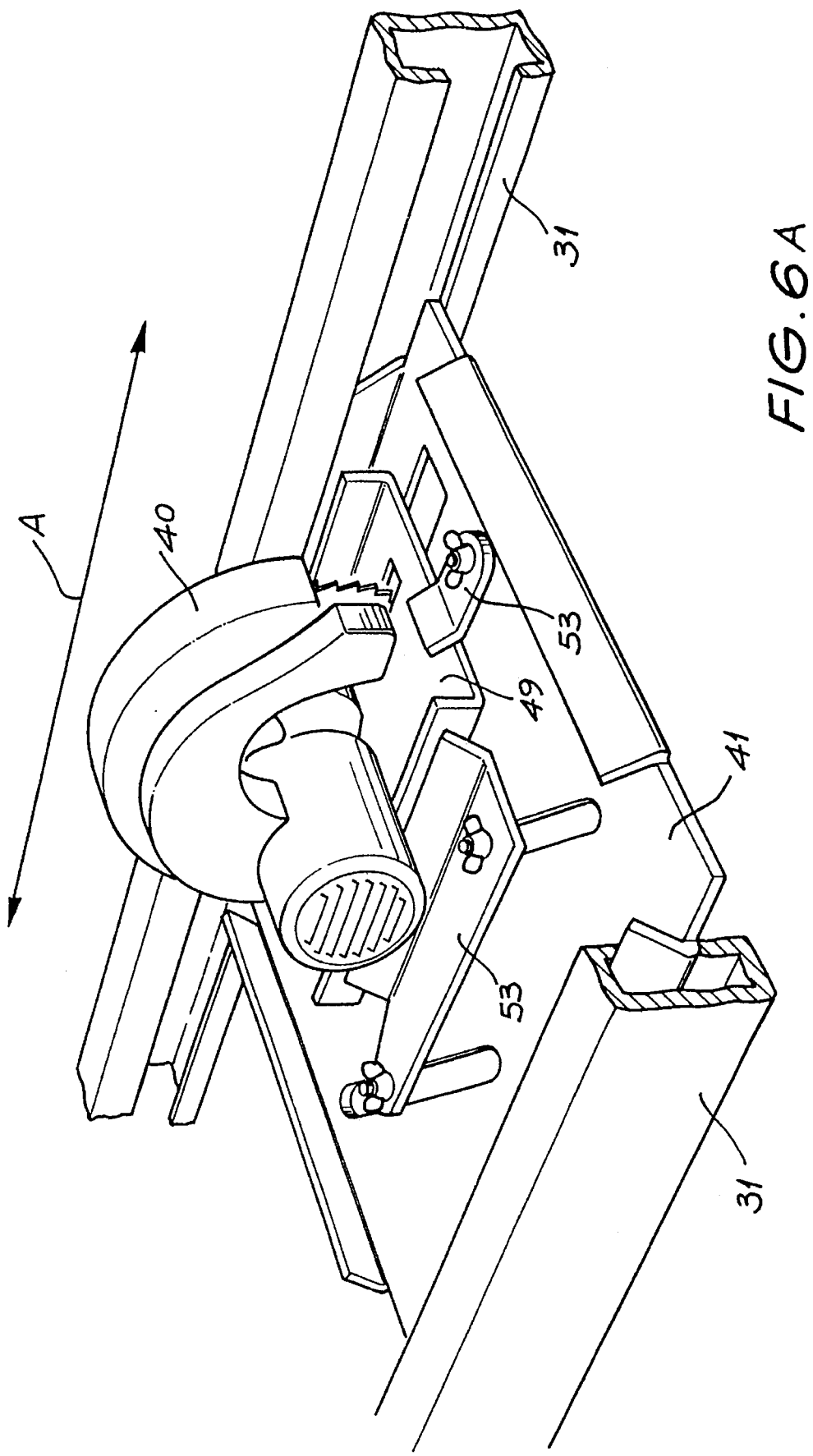
FIG. 6A is a perspective view of a second mounting arrangement.

As also indicated in FIG. 5, a circular saw 40 or base plate 41 can be mounted into the carriage 38 or directly into the tracks 31 and the details of these alternative arrangements are respectively illustrated in FIGS. 6 and 6A.

As seen in FIG. 6, the carriage 38 is provided with wheel 42 (or equivalent arrangement such as slides or bearings) which enable the entire carriage 38 to be slid backwards and forwards along the upper rails 31 in the direction of arrow A within predetermined limits able to be set by means of four stops 43 only one of which is illustrated. In this connection it will be appreciated that the upper rails 31 have a C-shaped configuration and the stops 43 each comprise a block 44 located within the rail 31 and a fastener 45 which clamps the block 44 against the rails 31 and thereby determines its position. These stops each have a thumbscrew with a threaded end protruding adjustably so the carriages limited travel can be micro-adjusted.

In addition to the front to rear movement along the rails 31, the carriage 38 is also provided with a pair of transverse rods 46 which form the axles for the wheels 42. Located on each transverse rod 46 and slidable therealong is a corresponding sleeve 39. A pair of V-shaped members 47 extend longitudinally between the sleeves 39. The V-shaped members 47 are slidably adjustable in the direction of arrow b along the sleeves 39 Thumbscrews 48 enable the position of the V-shaped members 47 to be set so as to grasp but not clamp the base plate 49 of the circular saw 40 and wing-nuts on threaded rods (not illustrated) are adjusted to secure the setting. Similarly, the V-shaped members 47 each carry a pair of U-shaped stops 50 (only one of which is illustrated) which determine the extent of the longitudinal sliding movement in the direction of arrows C of the base plate 49 within the V-shaped members 47. Finally, two C-shaped stops 51 (only one of which is illustrated) are provided on the transverse rods 46 so as to limit the left and right movement in the direction of arrows D of the sleeves 39 (and hence the V-shaped members 47) along the transverse rods 46.

In an alternative to the C-shaped stops 51 there are provided, but not illustrated, plastic nuts (which self lock) on threaded cross-rods 46.

FIG. 6A illustrates an alternative arrangement in which a base plate 41 is carried directly by the upper rails 31 and is slidable therealong in the direction of arrow A. Clamps 52 are provided in order to enable the base plate 49 of the circular saw 40 to be secured to the base plate 41. As best seen in FIG. 5, the base plate 41 is provided with various apertures and slots in order to accommodate various different types of power tools.

The operation of the apparatus as thus far described, as a guiding and control apparatus for work from above power tools, will now be described.

As best seen In FIG. 5, the workpiece to be cut (not illustrated) is placed on the support guide 25 and pushed rearwardly so as to be in abutment with the rear lip or fence 52 thereof. The intended angle of cut is set by adjustment of releasable clamp 20 or by thumbscrew 20A if cross location setting is required. When set, then lock with clamps 19 and 20. The depth of cut is set by turning the handle 35 so as to variably control the height of the upper rail 31 relative to the workpiece as necessary. For bevel cutting simply use the saw's own adjustment and rotate handle as to reset the depth of cut. The cut Is then made by sliding the carriage 38 along the upper rails 31. Where the power tool is a router or a circular saw fitted with a cutter rather than a sawblade, instead of a narrow cut being formed in the workplace, it is often desired to form a groove of substantial width. This can be done in a number of strokes by moving the carriage 38 from front to rear and with each stroke moving the carriage 38 sideways by sliding the sleeves 39 and hence the machine tool by a small increment corresponding to the width of the cutter. The various stops 43, 50 and 51 can be set so as to dertermine the length and width of the groove with repeatable accuracy. These stops can be adjustably screwed to increase accuracy and speed of set up.

It should be appreciated if a drill press were used in this manner a rectangularly adjustable pattern of up to four holes can be drilled and by use of the distance locating device (described later) can of course, be repeated at predetermined spacings.

The conversion of the apparatus from its work from above to its work from below configuration will now be described with reference to FIGS. 7 and 8. With the circular saw 40 still mounted in the carriage 38, the lower pin 54 of the linkage 32 is removed thereby enabling the entire upper rails 31 to be pivoted in a vertical plane about the linkage 33 from the position illustrated in FIGS. 5 and 7 into the position illustrated by broken lines in FIG. 8. The linkage 32 is then relocated in the case 2 to reinstate the variable screw height control of the parallelogram 9 with the machine tool 40 inverted but without the interconnection of the lower rails.

As also illustrated by broken lines in FIG. 8, a cross brace 55 is interconnected between the upper carriage 38 and a point intermediate the ends of linkage 33. In this way, operation of the handle 35 still raises and lowers the position of the upper rails but the carriage 38 slides along the upper rails 31 so that the saw 40 moves substantially vertically rather than moving in an arc which would be the case if the carriage 38 were fixed to the upper rails 31.

Alternatively, brace 55 may be replaced by a vertical peg held fixed relative to the table as a whole and closely fitted into a guide hole fixed to the carriage 38. As the carriage 38 is raised or lowered it will slide up or down the peg thus maintaining its position relative to the table.

Not shown in the drawings is an alternative inversion arrangement which includes two pairs of openings in the upper surface of the rails 31. The openings of each pair are aligned across the frame 9 and each pair of openings is positioned at a respective end of travel of the carriage 38 within the rails 31, thus providing the openings in each of the four corners of travel of the carriage 38. The openings are sized to allow the wheels 42 to pass through the openings. To invert the carriage 38 it is slid to one end of its travel in the rails 31 and the pair of wheels 42 at that end are aligned with the openings, raised out through the openings, thence swung, with the carriage 32, 180° about the pair of wheels 42 remaining in the rails 31 and finally dropped back into the rails 31 through the opposite end openings.

It will be appreciated that out of the case 2 are folded two prop frees 56 and 57 which support the respective ends of the case 2 remote from the support frame 8. The end of the case 2 adjacent the support frame 8 is secured to the front cross member 21 by means of the support plate 15 (FIG. 2). The circular saw 40 which is now upside down, protrudes through an aperture 58 in the case 2 and is therefore able to cut from below a workpiece positioned on the upper surface of the case 2. This mode of cutting is particularly suited to the ripping of long pieces of timber in the direction of the grain.

In an alternative embodiment of the parent invention (not illustrated) a single side of the carry case 2 is used as the cutting table.

As seen in FIG. 8, in order to support such cutting action, an L-shaped support guide 59 is able to be mated with the transverse guide 14 so as to set the distance between the blade of the circular saw 40 and the upturned lip 60 of the support guide 59.

As seen in FIG. 9, the support guide 60 is reversible so as to locate the lip 60 closely adjacent to the cutting blade of the circular saw 40, if desired. This reversal and sliding action are brought about by the dovetail shape of the guide 14 and the corresponding attachments (FIG. 9) to the support guide 59. The guide 14 has an inner male section that is able to slide telescopically and lock (method of locking not shown) to extend the range of width between the upturned lip 60 and saw blade 40. Operation of the handle 12 rotates the shaft 11 (FIG. 2) so as to release or clamp the locking cam 10 thereby fixing the support guide 59 at any predetermined position.

The support guide 59 has a slot 65 for viewing an embedded rule 66 in the table/benchtop, by placing the lip 60 against the sawblade 40 and then marking on part 59 the position of "0" read from the rule all measurements can then be read directly at that mark. When used with part 59 reversibly inverted a second mark is made at slot 67 at a point corresponding where an addition of for example 500 mm when added to the indicated measure gives the correct distance of setting from sawblade 40 to fence 60.

Turning now to FIG. 9, the case 2 is also provided with a slide out L-shaped support 63 which enables long and/or wide pieces of timber 64 (illustrated in phantom) to be guided and supported during what would normally be the cross cutting operation. An L-profiled fence 61 is pivotally mounted on the support 63 at pivot 62. The fence 61 is used to control the angle of the cut. For example if the fence 61 is pivoted at an angle to the circular saw this enables the fence 61 to be used as a guide along which a straight edge of a piece of timber to be cut can be held so as to enable the saw blade to cut the timber at a predetermined angle relative to that straight edge. If desired a stop (not illustrated) can be secured to the fence 61 to determine the length of a piece of timber to be cut when multiple lengths are required each with a set angle. This is particularly suited to cutting large panels to length and/or angle when required.

Figure 10:
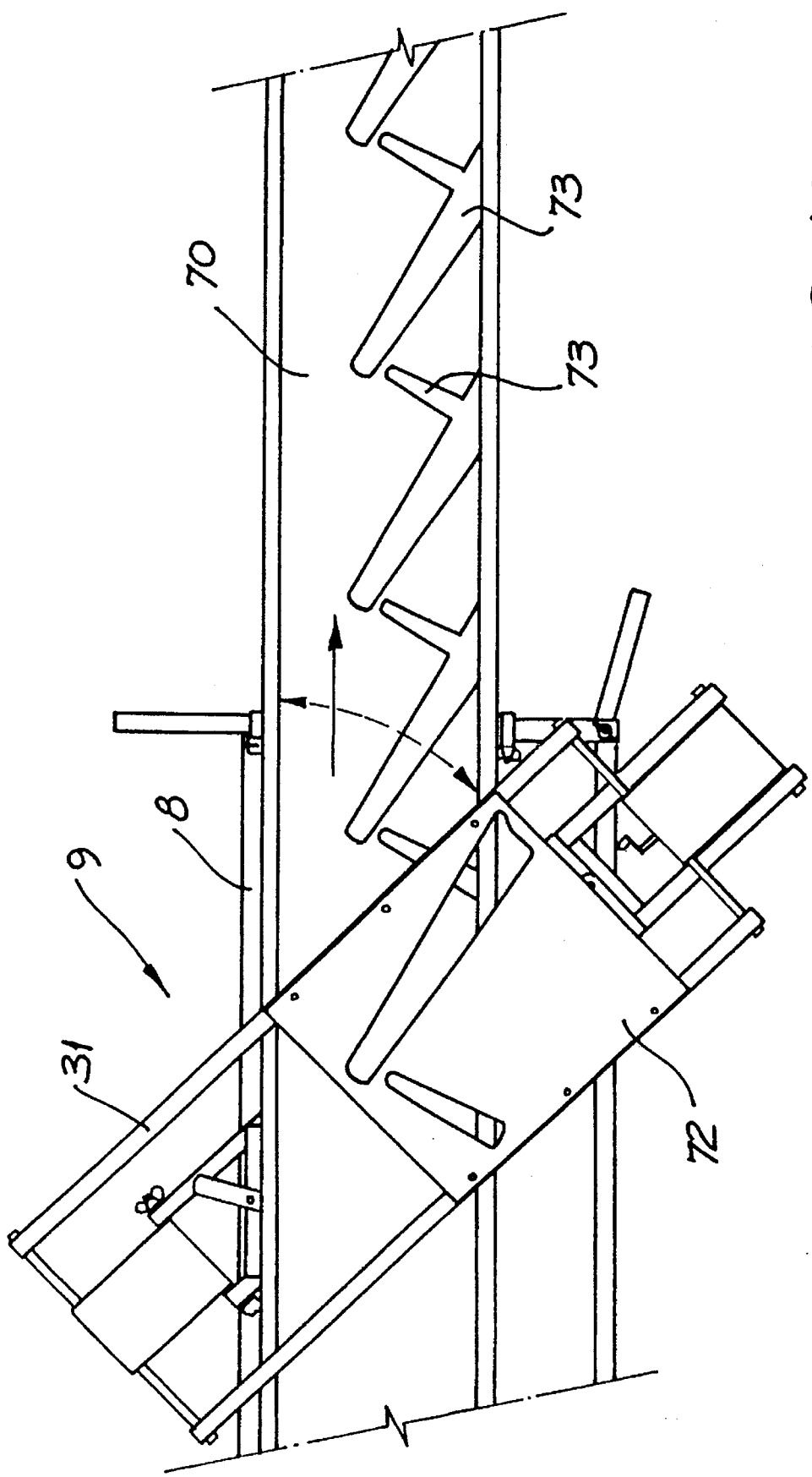
FIG. 10 is a plan view in the work from above configuration illustrating an alternative power tool mounting.

FIGS. 10 and 10A illustrate how the apparatus of the preferred embodiment of the patent invention in its work from above configuration can be used to cut out, for example the side support beams, or stringers, of a staircase. The righthand stringer is illustrated being cut in FIG. 10 and the lefthand stringer is illustrated being cut in FIG. 11. Located on the upper rails 31 is a template 72 through which the cutter or bit of a router (not illustrated) is passed. The template 72 is shaped so as to produce the desired shape or trench housing 73 in the stringers 70, 71 to accommodate the treads and rises of the staircase. In each instance, the parallelogram frame 9 is turned relative the support frame 8 to align the template profile at the intended angle of descent of the staircase. Each trench housing 73 is then routed in turn with the template 72 being maintained stationary above the stringer 70. As each trench housing 73 is in turn cut, the stringer is then moved longitudinally along the support frame 8 and the next trench housing 73 is cut. In FIG. 10, the trench housings 73 are commenced at the righthand end of the stranger 70 and the stranger 70 is moved from left to right as seen in the drawing whilst in FIG. 10A, the trench housings 73 are commenced at the lefthand end of the stranger 71 and the stringer 71 is moved from right to left as seen in the drawing. It will be appreciated by those skilled in the art that the above described arrangement enables the right and left hand stringers 70, 71 of the staircase to exactly match and the long length of the parallelogram frame 9 enables the angle at which the parallelogram frame 9 is set relative to the support frame 8 to be determined with considerable accuracy. The result is an accurate job which is able to be accomplished in a short time with considerable ease.

Figure 11:
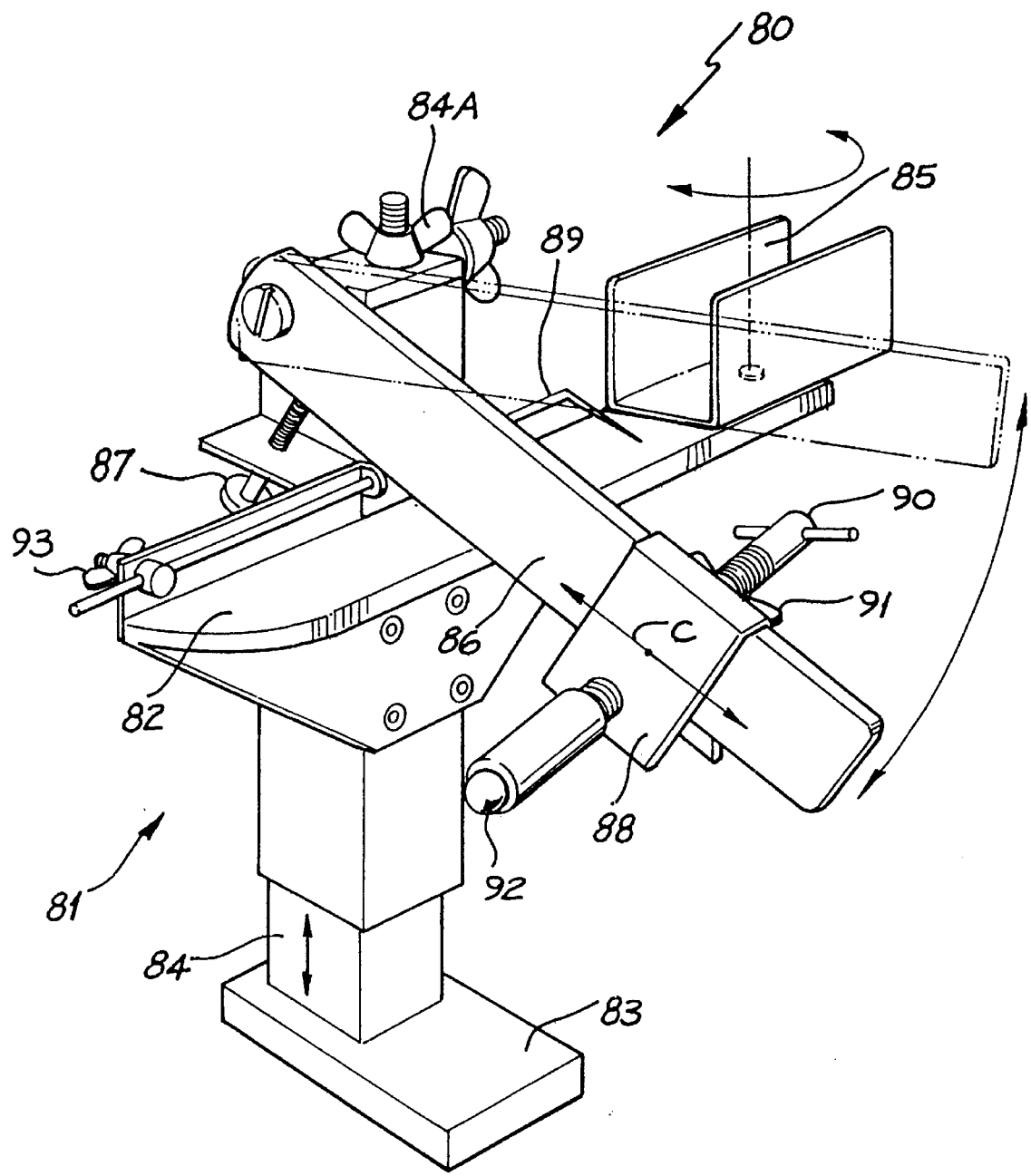
FIG. 11 is a perspective view of a distance locating device in accordance with an embodiment of the present invention.

FIG. 11 illustrates a distance locating device 80 in accordance with a first embodiment of the present invention, device 80 being able to be secured to the workplace support guide 25 by means of a clamp 81 formed from L-shaped flange 82 and a plate 83 mounted on a slidable central rod 84. The distance between the lower surface of the flange 82 and the upper surface of the plate 83 is governed by a central threaded bar connected to the rod 84 and which carries a wing nut 84A. A tape measure receiving bracket 85 is also located on the flange 82.

Pivotally mounted at the top of the device 80 is an arm 86 which can be swung through the positions illustrated by broken lines in FIG. 11 with the lowered position being adjustably set by the screw 87. Slidably and adjustably mounted on the arm 86 is a bridle 88 through which a threaded bar 90 is screwed on a substantially downward angle.

A wing nut 91 releasably locks the bridle 88 and threaded bar 90 at any desired position along the arm 86. The threaded bar 90 (when released) is able to be rotated to determine precisely the distance between the point 92 of the bar and the operative member of the power tool.

A fine saw cut is placed at say, any point along the fence of the workpiece support at a distance from the cutter of the power tool not exceeding the distance between the point 92 and the cursor 89. By this means the free end of the tape has been adjusted to suit the application. In the described embodiment of FIG. 13 this is approx. 150 mm. The tape's own hook is inserted into this saw cut and the main body of the tape measure is then clipped onto the receiving bracket 85 by its own clip. The bracket 85 is rotatable to allow the attachment of "right-handed" and "left-handed" tapes. The adjustable cursor 89 is then set to indicate on the tape the measurement between the point 92 and the operative member of the power tool and locked with wing nut 93. Any discrepancy can be finely adjusted by rotation of the threaded bar 90. From then on any length can be rapidly selected and set by relocating the device 80 with the cursor 89 indicating upon the tape the precise length to be cut.

This same application of "referred" measure can also be applied for example, to the cutting of architraves of numerous and varying lengths with a mitre at each end requiring the measure of length to be taken from the "short corners" by simply relocating the tape's own hook an appropriate amount and then reading the length of cut indicated by the cursor on the tape.

Figure 12:
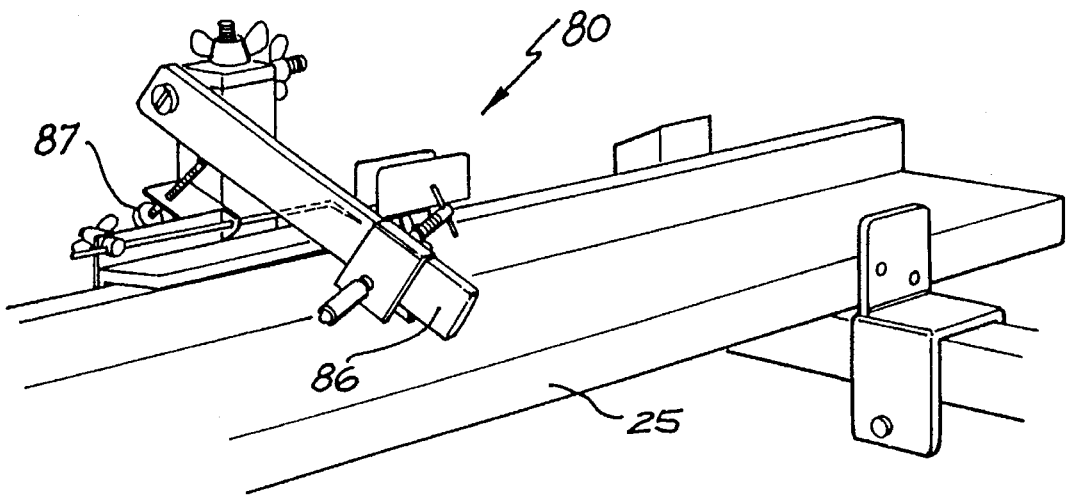
FIG. 12 is a perspective view showing the device of FIG. 11 clamped to the workpiece support guide of the apparatus of FIGS. 1–10.

FIG. 12 illustrates the device 80 clamped to the workpiece support guide 25. The bridle 88 with the bar 90 are set on the arm 86 in the operative position for use as a work length stop.

Figure 13:
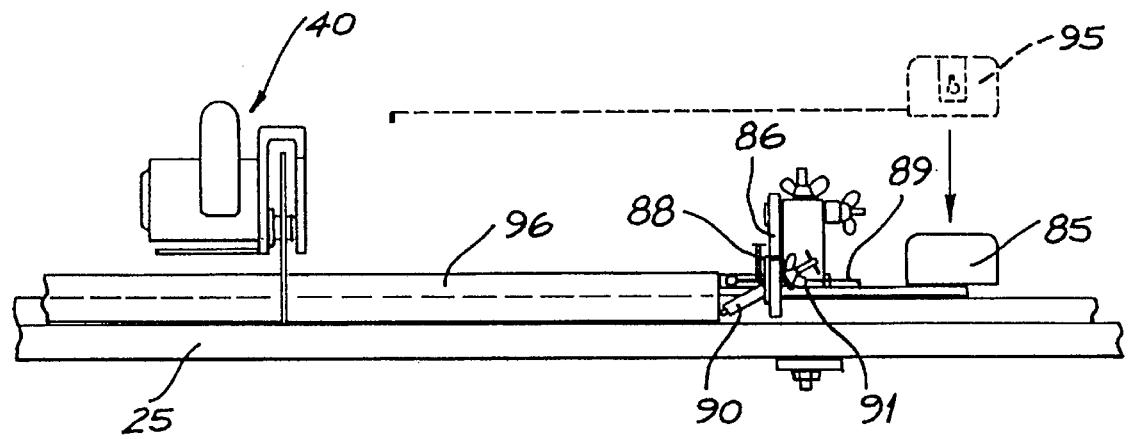
FIG. 13 is a front elevation showing one method of operation using the device of FIG. 11.

As illustrated in FIG. 13, in this configuration a conventional coilable tape measure 95 can be clipped by its own belt clip (illustrated in ghost lines) onto the bracket 85 and adjusted and then used in the manner previously described. This is particularly useful for rapid setup when cutting a number of pieces of material at multiples of varying lengths from a long piece of stock material. Such cut to length material 96 for example being timber as required for the hoggings of a timber framed wall.

Figure 14:
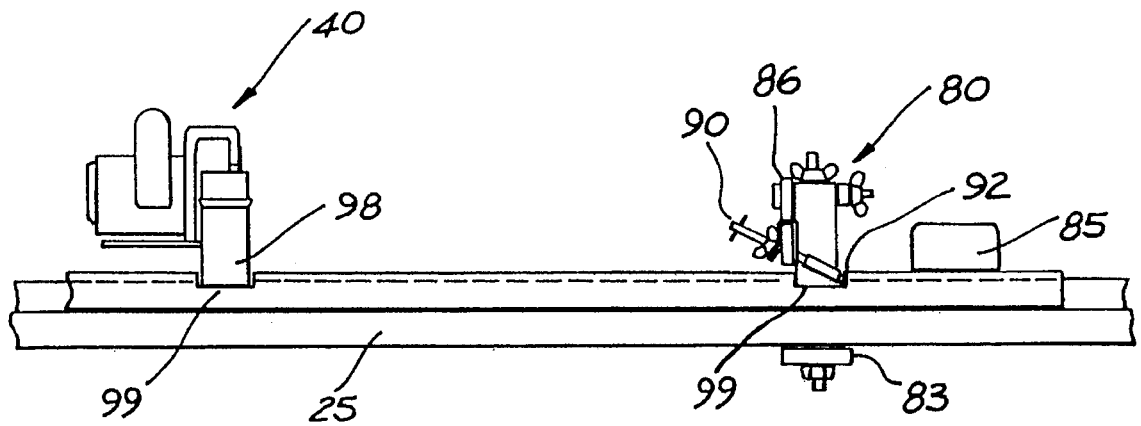
FIG. 14 is another front elevation showing another method of operation using the device of FIG. 11.

Finally FIG. 14 illustrates a method of using device 80 together with a power tool using a trenching head 98 to cut trenches 99 at a predetermined spacing from each other. In this use, the direction of the bar 90 is reversed by end inverting the bridle 88 and slidably setting it at the required position along arm 86 and at a suitable height by adjustment of screw 87. One trench is cut in the correct position, then, with the device 80 at the predetermined space from the trenching head 98, the work material, say a piece of timber is moved from left to right as seen in FIG. 14. The point 92 slides along the top of the timber until it drops into the cut trench A short push to the left brings the point 92 into abutment with the right hand edge of the cut trench 99. Then the trenching head 98 is moved past the timber to cut the next trench 99. The timber is then again moved from left to right thereby bouncing the arm 86 (and hence point 92) out of the previously cut trench 99. The timber is moved further from left to right until the point 92 is located in the last cut trench 99, the next trench 99 is cut, and so on. This method is particularly useful in cutting trenches in wall plates for studs, for example.

This distance locating device provides the following benefits:
1. Provides a more efficient system of length selection that can be conveniently used with any standard measuring tape.
2. Has micro adjustable zero.
3. Can be quickly fitted to most sizes of material that are likely to be used as the fence of a workpiece support.
4. The location of the point 92 is infinitely adjustable and can be set so as to come into contact at any desired particular point on the end of the work material and at the same time remain clear of the workpiece support and guide fence, this feature virtually eliminates the need to constantly check for and clean away offcuts and sawdust that normally accumulate against the stop and affect accuracy. For example an aluminium extrusion of hollow section being cut to a work length stop would normally present such a problem.
5. When not in use the arm 86 can be flipped over out of the way, this feature is of great value if more than one stop is desired in use, with the body of the measuring tape attached at an extremity any number of these stops may be fitted to the fence being independently free to slide to any position indicated on the tape by their own cursor and be locked at that location with the arm 86 flipping over into or out of the operable position, thus, leaving a clear path when requiring to use a more remote preset stop at a further length of setting.
6. By end inverting the bridle 88 the device becomes an automatic trench locator having similar advantages as when used in the length stop mode.
7. Because of the adjustability of the bridle 88 and hence the threaded bar 90 means it can be used also for locating holes at repeated set spacings precisely and automatically.
8. In either mode the feature of "referred" measure read on the tape ensures the tape end is located at a safe distance from the operative member of the power tool.

Figure 15:
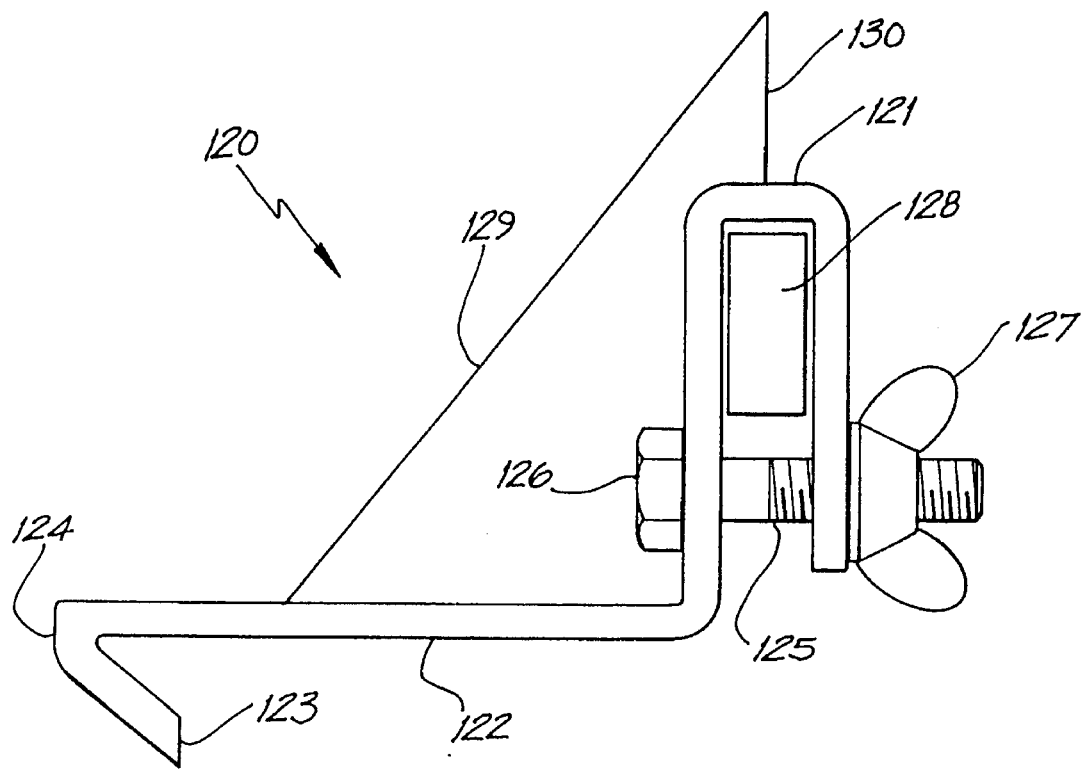
FIG. 15 is a side view of another embodiment of a workpiece positioning device in accordance with the present invention.
Figure 16:
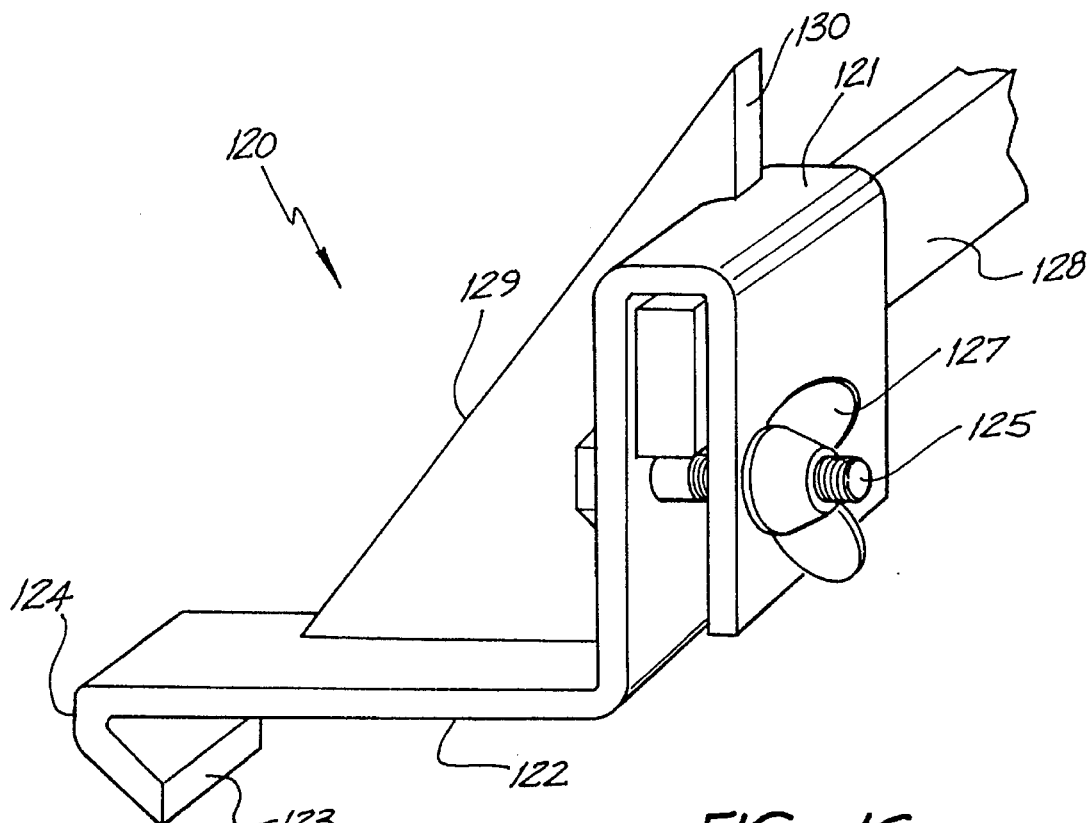
FIG. 16 is a perspective view of the FIG. 15 embodiment.

A second embodiment of a workpiece positioning device 120 is shown in FIGS. 15 and 16. Device 120 comprises a sheet made from a substantially rigid material which is bent to form U-shaped section 121, elongate member 122 and barb 123. Elongate member 122 extends laterally from one of the legs of U-shaped section 121, and barb 123 is formed where elongate member 122 is folded backwards at a first end. Stop 124 is formed by the boundary caused by the fold at the first end of elongate member 122.

The two legs of U-shaped section 121 are pierced by holes through which screw 125 passes. Preferably, screw head 28 is positioned proximate elongate member 122 and butterfly nut 127 can be screwed onto screw 125 so that the distance between the two legs of U-shaped section 121 can be varied. For this purpose, the substantially rigid material should also possess a certain amount of resilience. U-shaped section 121, together with screw 125 and butterfly nut 127 form a mounting means for mounting device 120 on bar 128 which may form part of an associated apparatus.

Device 120 is provided with additional strength by web 129. A first edge of web 129 is attached to a first side of elongate member 122, and a second edge of web 129 is attached to one of the legs of U-shaped section 121. As will be described below, web 129 can also provide device 120 with added versatility.

Figure 17:
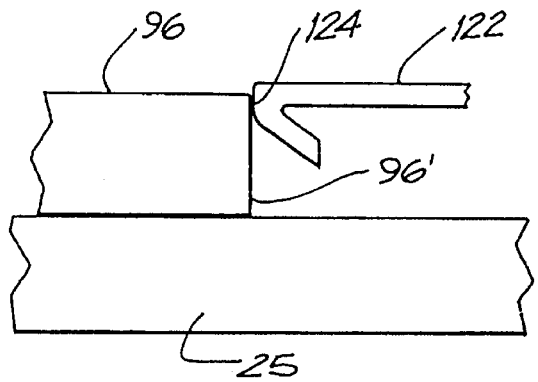
FIG. 17 is a side view of a part of the workpiece positioning device of FIGS. 15 and 16 showing an outer surface of a workpiece being positioned.
Figure 18:
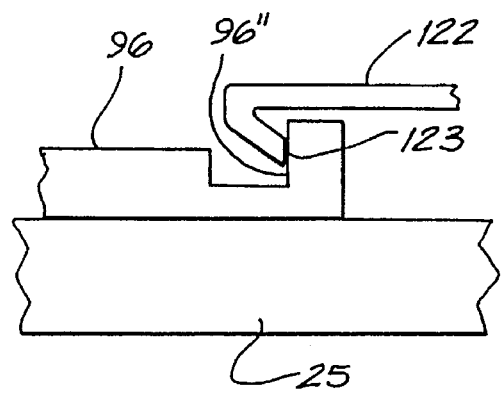
FIG. 18 is a side view of a part of the workplace positioning device of FIGS. 15 and 16 showing an inner surface of a Workplace being positioned.

FIGS. 17 and 18 show views of the first end of elongate member 122 in operation. In FIG. 17, stop 124 together with support guide 25 is used to position workpiece 96 with reference to outer surface 96 . Such positioning may be required, for example, when cutting workpiece 96 to a certain length. In FIG. 18, barb 123 together with working surface or support guide 25 is used to position workpiece 96 with reference to inner surface 96 . Such positioning may be required, for example, when milling parallel channels in workpiece 96, and when the distance from surface 96A to another reference location is significant.

Although FIGS. 17 and 18 show elongate member 122 projecting towards the left and workpiece 96 positioned essentially to the left of elongate member 122, these orientations are not necessarily fixed. Both the orientation of workpiece 96 and the orientation of device 120 can be reversed. For example, the orientation of device 120 can be reversed by loosening butterfly nut 127, removing device 120 from bar 128, rotating device 120 about a first axis substantially perpendicular to the longitudinal axis of elongate member 122, remounting device 120 on bar 128, and tightening butterfly nut 127.

Figure 19:
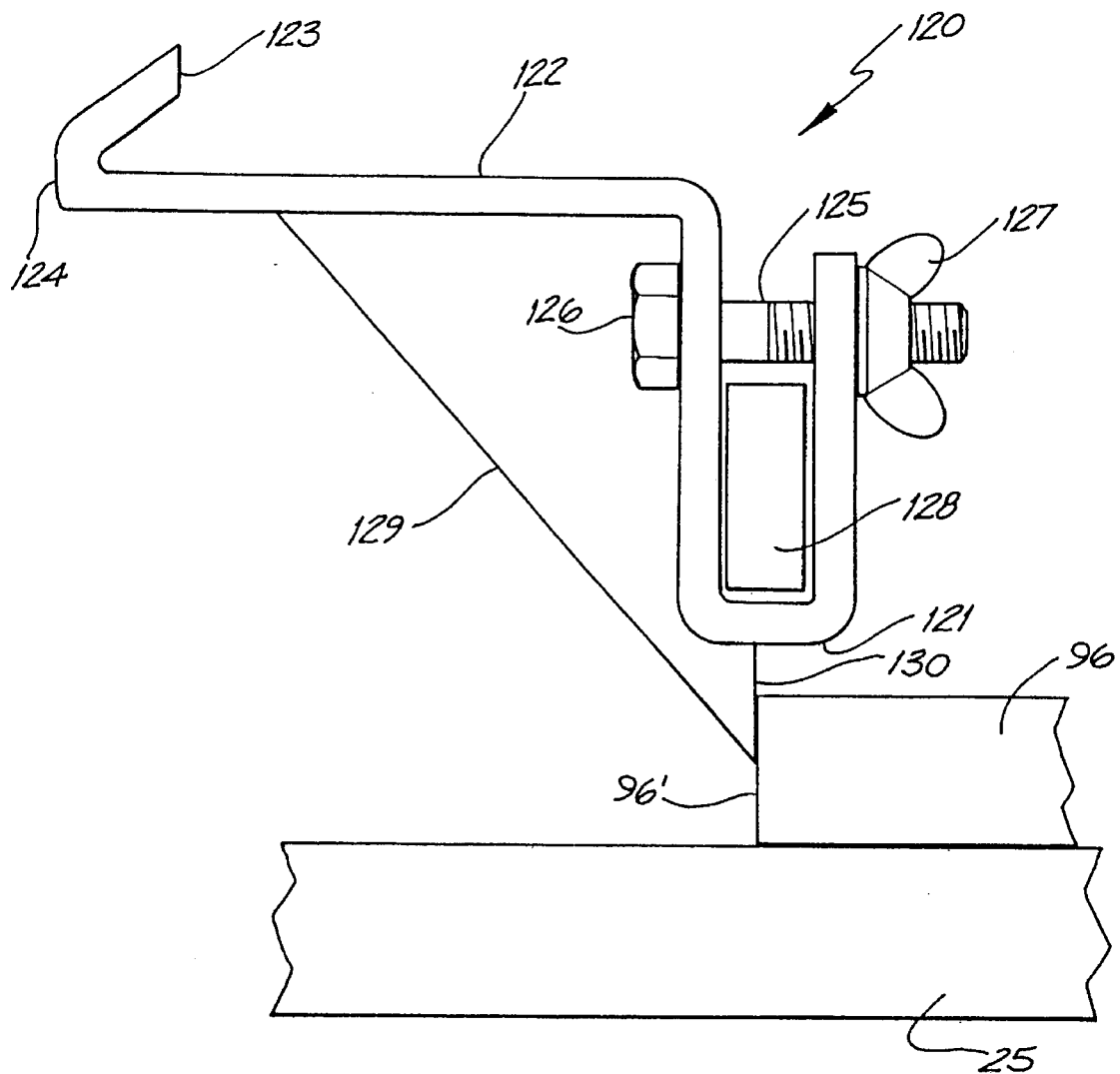
FIG. 19 is a side view of the embodiment of the workpiece positioning device of FIGS. 15 and 16 in which the device has been rotated so that a web acts as a stop.

Some additional versatility provided by web 129 is illustrated in FIG. 19, where device 120 has been rotated about a second axis substantially parallel to the longitudinal axis of elongate member 122. In this rotated position, the apex of substantially-triangular web 129 can act as a stop or a barb for positioning workpiece 96. Although FIG. 19 shows elongate member 122 projecting towards the left and workpiece 96 positioned essentially to the right of U-shaped section 121, these orientations are not necessarily fixed. For example, the orientation of device 120 can be reversed as described above.

If the apex of web 129 extends to a point such that projection 130 is substantially aligned with an effective centre line through U-shaped section 121, then device 120 may be rotated about the first axis to reverse the orientation of projection 130, but without substantially altering its position. This may be useful, for example, when workpieces must be positioned with reference to both inner and outer surfaces at a fixed reference location.

Thus, there has been described another embodiment of a workpiece positioning device for use with a portable, multi-purpose apparatus for controlling power tools. This embodiment provides a stop, a barb, and a web which can act as a stop or a barb. In addition, the orientation of the device can be reversed in two planes at least.

In a still further embodiment as shown in FIGS. 20–23 the distance locating device or work length stop 200 comprises a vertically adjustable arm 286 where the vertical adjustment is provided by a screw height adjuster 287. Bridle 288 mounts extension arm 290 which supports an adjustable end stopping surface member 292. Member 292 is adjustable to a range of angles in a horizontal plane as shown by the adjustment as between FIGS. 20, 21 on the one hand and FIG. 22 on the other. In FIG. 23 the extension arm 290 is rotated through 90° relative to the orientation shown in FIGS. 20–22 which enables member 292 to be employed as a barb to locate the relative positions of a series of trenches cut in a timber workpiece.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A distance locating device adapted to be attached to a machine tool apparatus, said device being adapted to cooperate with a measuring tape and including an index positioned to align with measurements on the tape, a stopping member being positioned so that a distance between ends of the stopping member and an operative member of a machine tool attached to the apparatus corresponds to a measurement simultaneously read at the index.

2. A distance locating device as claimed in claim 1 wherein the index is adjustable.

3. A distance locating device as claimed in claim 1 wherein the index is fixed.

4. A distance locating device as claimed in claim 1 wherein the stopping member is adjustable.

5. A distance locating device as claimed in claim 1 wherein the stopping member is fixed.

6. A distance locating device as claimed in claim 1 wherein the end of the tape is adjustable relative to the device.

7. A distance locating device adapted to be attached to a machine tool apparatus comprising a support adapted to be adjustably fixed to a workpiece guide of a machine tool apparatus, said device comprising a rigid member secured to the support for movement within a plane and a stopping member being adjustably securable along the rigid member and extending an adjustable transverse length from the rigid member in a direction towards the machine tool when attached to the apparatus, and said distance locating device being further adapted for automatic self-location of a cut trench or drilled hole at a predetermined distance from the next trench to be cut or hole to be drilled, said stopping member being substantially angled to the horizontal and reversibly secured to said rigid so member so as to be directed away from the machine tool when attached to the apparatus and further including means by which a lowered operating position of the rigid member is finely adjustable.

8. A distance locating device as claimed in claim 7 comprising a fixed index.

9. A distance locating device as claimed in claim 7 comprising an adjustable index.

10. A distance locating device as claimed in claim 7 wherein the end of a measuring tape fitted to said device is adjustable relative to the device.

11. A distance locating device comprising a support adapted to be adjustably fixed to a workplace guide of the machine tool apparatus, a rigid member secured to the support for movement within a plane, and a stopping member being adjustably securable along the rigid member and extending a transverse length from the rigid member in a direction towards the machine tool when attached to the apparatus, a barb projecting form and in the reverse direction of the stopping member, said barb being adapted in use to contact an end face of a trench formed in a workplace while maintaining the stopping member out of contact with said trench.

12. A distance locating device as claimed in claim 11 further comprising means for automatic self location of a recess cut in the workpiece at a predetermined distance form a next recess to be cut in the workplace, said stopping member being substantially horizontally disposed and reversibly securable to said rigid member so as to be directed away form the machine tool when reversibly attached to the apparatus via reversible clamping means.

13. A distance locating device as claimed in claim 12 further including means by which a lowered operating position of the rigid member is finely adjustable.

14. A distance locating device as claimed in claim 11 adapted to support a standard measuring tape with measurement being read at an adjustable index corresponding to the distance between the end of the stopping member and the operative member of a machine tool attached to the device.

15. A device as claimed in claim 11, wherein the rigid member allows the device to rotate about a first axis substantially perpendicular to a longitudinal axis of the stopping member so that the positioning device may be used to position workpieces in at least two orientations with respect to the first axis.

16. A device as claimed in claim 11, wherein the rigid member further allows the device to be rotated about a second axis substantially parallel to the longitudinal axis of the stopping member.

17. A device as claimed in claim 13 further comprising a projection on said stopping member protecting away from the rigid member in a direction parallel to the plane and wherein said projection is adapted to perform as a further slopping member or a further barb when the device is rotated between two positions about a second axis, said second axis being substantially parallel to the longitudinal axis of the stopping member.

18. A distance locating device adapted to be attached to a machine tool apparatus, said device being adapted to be cooperatively used with distance measuring means and including an index positioned to align with measurements on said measuring means, a stopping member having an end stopping surface offset from the index toward an operative member of the machine tool, said offset of said end stopping surface being such as to enable a range of measurements, relative to an initial measurement between the stopping surface and the operative member, to be read at said index.

19. A device as claimed in claim 18, wherein the offset between the end stopping surface and the index is adjustable.

20. A device as claimed in claim 18, wherein the distance measuring means is a measuring tape.

21. A device as claimed in claim 20 wherein the tape measure is a coilable tape measure having a belt clip, said measure being adapted to be mounted on the device via the belt clip at a location on the device at a distance from the operative member greater than the distance from the operative member to the index.

22. A device as claimed in claim 21, wherein an end of the tape is adjustable relative to the device.

23. A distance locating device as claimed in claim 18, comprising a support adapted to be adjustably fixed to a workpiece guide of the machine tool apparatus, a rigid member extending transversely from the support, said member being movable within a vertical plane and having said stopping member securably adjustable along the length of said rigid member.

24. A distance locating device as claimed in claim 18, further including means for adjustably raising or lowering the height of the stopping surface relative to the apparatus to provide a range of working heights of said stopping surface relative to the apparatus.

25. A device as claimed in claim 23, being adapted for automatic self location of a cut trench or drilled hole at a predetermined distance from the next trench to be cut or hole to be drilled, said stopping surface being on a projection angled from the horizontal and projecting away from the machine tool when in use.

26. A distance locating device as claimed in claim 25 wherein the distance measuring means is a coilable tape measure having a belt clip, said measure being adapted to be mounted on the device via the belt clip at a location on the device at a distance from the operative member greater than the distance from the operative member to the index.

27. A distance locating device as claimed in claim 23, wherein the stopping surface is angularly adjustable in a horizontal plane when in use.

28. A distance locating device adapted to be attached tea machine tool apparatus, said device comprising a stopping member having a stopping surface wherein the height of the stopping surface is adjustable relative to the apparatus to provide a range of working heights of said stopping surface relative to the apparatus.

29. A distance locating device as claimed in claim 26 wherein the range of working heights include heights having a vertical clearance between the stopping surface and a workpiece support surface.

\* \* \* \* \*